US012102578B2

(12) United States Patent
Gosselin et al.

(10) Patent No.: US 12,102,578 B2
(45) Date of Patent: Oct. 1, 2024

(54) SYSTEM FOR ADJUSTING A CONFIGURATION OF A PATIENT SUPPORT APPARATUS

(71) Applicant: UMANO MEDICAL INC., L'Islet (CA)

(72) Inventors: Jérôme Gosselin, Lévis (CA); Jimmy Laflamme, Lévis (CA); Jérôme Marcotte, Lévis (CA); Myriam Gharbi, Quebec (CA); Frédérik Levesque, Lévis (CA); Steve Bolduc, Beaumont (CA); Esther Berthelot, Lévis (CA)

(73) Assignee: UMANO MEDICAL INC., L'Islet (CA)

( * ) Notice: Subject to any disclaimer, the term of this patent is extended or adjusted under 35 U.S.C. 154(b) by 751 days.

(21) Appl. No.: 17/259,669

(22) PCT Filed: Jul. 12, 2019

(86) PCT No.: PCT/IB2019/055976
§ 371 (c)(1),
(2) Date: Jan. 12, 2021

(87) PCT Pub. No.: WO2020/012441
PCT Pub. Date: Jan. 16, 2020

(65) Prior Publication Data

US 2021/0315754 A1 Oct. 14, 2021

Related U.S. Application Data

(60) Provisional application No. 62/697,600, filed on Jul. 13, 2018.

(51) Int. Cl.
*A61G 7/018* (2006.01)
*A61G 7/015* (2006.01)

(52) U.S. Cl.
CPC ............. *A61G 7/018* (2013.01); *A61G 7/015* (2013.01)

(58) Field of Classification Search
CPC .......... A61G 7/002; A61G 7/05; A61G 7/012; A61G 7/015; A61G 7/018; A61G 7/005; A61G 7/008
See application file for complete search history.

(56) References Cited

U.S. PATENT DOCUMENTS 1,055,241 A * 3/1913 Terry ..................... A61G 7/015 5/618
2,481,477 A * 9/1949 Peery .................... F16H 25/205 475/2

(Continued)

FOREIGN PATENT DOCUMENTS

EP 2762122 B1 9/2016
KR 20-2010-0003809 U 4/2010

(Continued)

OTHER PUBLICATIONS

International Search Report from PCT/IB2019/055976 mailed Nov. 13, 2019.

(Continued)

*Primary Examiner* — Justin C Mikowski
*Assistant Examiner* — George Sun
(74) *Attorney, Agent, or Firm* — STEPTOE LLP; Scott Richey

(57) ABSTRACT

An adjusting system for adjusting a configuration of a bed, the bed comprising a central frame and a side panel movable relative to the central frame, is disclosed. In one embodiment, the adjusting system is provided with a clutch assembly. In another embodiment, the adjusting system is provided with a telescopic handle assembly.

17 Claims, 22 Drawing Sheets

(56) References Cited

U.S. PATENT DOCUMENTS

| | | | | | |
|---|---|---|---|---|---|
| 2,802,219 | A * | 8/1957 | Don | A47C 20/041 | 5/616 |
| 4,345,344 | A * | 8/1982 | Gadoury | A61G 7/002 | 5/618 |
| 4,499,618 | A * | 2/1985 | Werner | A61G 7/002 | 192/48.8 |
| 5,095,562 | A * | 3/1992 | Alexander | A47C 20/041 | 5/619 |
| 5,392,479 | A * | 2/1995 | Liao | A61G 7/0573 | 5/942 |
| 5,920,944 | A * | 7/1999 | Biggs | B25G 1/102 | 16/430 |
| 6,357,065 | B1 * | 3/2002 | Adams | A61G 7/005 | 5/617 |
| 6,687,932 | B1 * | 2/2004 | Bangert | A47C 20/041 | 5/617 |
| 7,406,729 | B2 * | 8/2008 | Hornbach | A61G 7/05 | 5/613 |
| 2002/0138905 | A1 * | 10/2002 | Bartlett | A61G 7/0507 | 5/607 |
| 2005/0166323 | A1 * | 8/2005 | Kawakami | A61G 7/015 | 5/613 |
| 2013/0168987 | A1 * | 7/2013 | Valentino | A61G 1/056 | 92/61 |
| 2013/0227787 | A1 | 9/2013 | Herbst et al. | | |
| 2013/0298331 | A1 | 11/2013 | Bossingham et al. | | |
| 2014/0215717 | A1 * | 8/2014 | Rigsby | A61G 7/0513 | 5/613 |
| 2015/0128347 | A1 * | 5/2015 | Hutchison | A61G 7/018 | 5/616 |
| 2016/0296394 | A1 | 10/2016 | Yamasaki et al. | | |
| 2017/0246064 | A1 | 8/2017 | Merioles | | |
| 2017/0340497 | A1 | 11/2017 | Rigsby et al. | | |
| 2018/0147101 | A1 | 5/2018 | Bossh'igham et al. | | |
| 2018/0280212 | A1 * | 10/2018 | Matheny | A61G 1/048 | |

FOREIGN PATENT DOCUMENTS

| | | | |
|---|---|---|---|
| WO | WO2016026495 | A2 | 2/2016 |
| WO | 2017/051386 | A1 | 3/2017 |
| WO | 2019/087123 | A1 | 5/2019 |

OTHER PUBLICATIONS

Written Opinion from PCT/IB2019/055976 mailed Nov. 13, 2019.
Examination Report from Australian Patent Application No. 2019300527, Jun. 25, 2024, 11 pages.

* cited by examiner

SYSTEM FOR ADJUSTING A CONFIGURATION OF A PATIENT SUPPORT APPARATUS

CLAIM PRIORITY

This application claims the benefit under 35 USC 371 to International Application No. PCT/IB2019/055976, filed Jul. 12, 2019, which claims priority to U.S. Provisional Patent Application No. 62/697,600, filed Jul. 13, 2018, each of which is incorporated by reference in its entirety.

TECHNICAL FIELD

The present invention generally relates to patient support apparatuses such as hospital beds, and more particularly related to adjusting systems for adjusting a configuration of a patient support apparatus, such as its width for example.

BACKGROUND

Hospital beds have several functions and uses. Since patients may have different weights and heights, beds larger than standard products with an area of about 35×78 inches, or 89 cm×198 cm, may be used.

These larger beds are used for the treatment of tall and/or obese patients. They may also serve to increase the comfort of patients who lie in a bed smaller than a residential bed. They can also be used for parents who want to get closer to their sick child and comfort them by lying with them. They can also be used for delivery rooms by increasing the comfort of a mother giving her more space and allowing the father to be closer to his wife during and after child birth.

Patient movements in hospital beds are necessary and common. Usually, the patient is transferred on a stretcher so as to be able to move him more easily from one location to another as well as in elevators.

Some doors have a width of about 42 inches or 107 cm which limits the dimensions of beds that may enter a room. The depth of the elevator also limits the dimensions of beds that may be transported therein. These large hospital beds must, however, be delivered to different rooms and must be able to be circulated in hospitals.

In order to overcome the above-described drawbacks of large hospital beds, beds the dimensions of which may be adjusted, i.e. adjustable or extendable beds, have been developed. Some extendable beds are manually operated. In this case, an operator must manually manipulate the bed in order to increase or decrease its surface area. However, these beds usually require multiple manipulations in order to fully adjust the width of the bed to a desired dimension and operation may be time consuming.

Other extendable beds have been provided with motors for automating the extension of the bed. However, those motorized beds comprise multiple motors, each for moving a respective section of the bed, which is expensive and cumbersome.

In order to further reduce some drawbacks of the prior art, the Applicant of the present invention developed a bed provided with an assembly enabling to laterally move several movable side sections of a bed when a single movable side section is moved. In one embodiment, the assembly includes a plurality of flexible control cables, as described in Applicant's PCT application published under WO 2017/051386.

However, it would still be desirable to provide an improved patient support apparatus with adjustable dimensions that would further reduce at least one of the above-mentioned drawbacks of known hospital beds.

SUMMARY

According to a broad aspect, there is provided an adjusting system for a patient support apparatus including a central resting surface and a panel section movable relative to the central resting surface between a retracted position and an extended position, the adjusting system comprising a bracket mounted to the panel section; a handle assembly rotatably mounted to the bracket, the handle comprising a first end allowing a user to manually operate the adjusting system and second end rotatably mounted to the bracket; an extending member comprising a first end rotatably mounted to the bracket and a second end operatively coupled to the resting surface of the patient support apparatus, the extending member being capable of extending and retracting along a longitudinal axis; and a clutch assembly operatively mounted to the bracket, the clutch assembly operatively engaging the second end of the handle and the first end of the extending member, the clutch assembly urging movement of the extending member upon actuation of the handle assembly below a defined resistance level of the extension member while preventing rotation of the extension member above or equal to the defined resistance level of the extension member, wherein the rotation of the extension member in a first rotation direction causes the panel section to move toward the extended position relative to the central portion while the rotation of the extension member in an opposed rotation direction causes the panel section to move toward the retracted position.

In one embodiment, the adjusting system further comprising a housing mounted to the panel section, the bracket being mounted to the housing.

In one embodiment, the adjusting system further comprising a gear assembly rotatably mounted to the bracket, the gear assembly collaborating with the clutch assembly to urge movement of the extension member upon actuation of the handle assembly.

In one embodiment, the gear assembly comprises a first, second, third and fourth gears, the first gear being operatively coupled to the second end of the handle and engaging the second gear, the fourth gear being operatively coupled to the first end of the extending member and being operatively engaged by the third gear, the clutch assembly being operatively coupled between the second gear and the third gear.

In one embodiment, the first gear is coplanar with the second gear; the third gear is coplanar with the fourth gear; and the second and third gears are coaxial.

In one embodiment, the first, second, third and fourth gear each comprise a spur gear.

In one embodiment, the clutch assembly comprises at least one ball and at least one spring, a given one of the second and third gears being provided with at least one ball seat each for receiving a portion of a respective one of the at least one ball, another one of the second and third gears being provided with at least one recess each for receiving a respective one of the at least one spring, the at least one ball and at least one spring allowing removable engagement of the second and third gears.

In one embodiment, the gear assembly comprises first and second gears, the first gear being operatively coupled to the second end of the handle assembly and operatively engaging the second gear, the clutch assembly being operatively coupled between the second gear and the first end of the extending member.

In one embodiment, the clutch assembly comprises at least one ball, at least one spring, a first annular ring coupled to the first end of the extending member and a second annular ring secured to the second gear, a given one of the first annular ring and the second annular ring being provided with at least one ball seat each for receiving a portion of a respective one of the at least one ball, another one of the first annular ring and the second annular ring being provided with at least one recess each for receiving a respective one of the at least one spring, the at least one ball and at least one spring allowing removable engagement of the first annular ring and the second annular ring.

In one embodiment, the adjusting system further comprising a housing mounted to the panel section, the bracket being mounted to the housing.

In one embodiment, the handle assembly is telescopic.

In one embodiment, the handle assembly comprises at least three sections.

In one embodiment, the extending member comprises a worm threadingly engageable to the resting surface of the patient support apparatus.

In one embodiment, the adjusting system further comprising an electric actuator for operating the extending member.

According to another broad aspect, there is provided an adjusting system for adjusting a configuration of a patient support apparatus, the patient support apparatus comprising a central portion and an adjustable panel movable relative to the central portion, the adjusting system comprising: a frame securable to the adjustable panel of the patient support apparatus; an extending member rotatably secured to the frame, the extending member extending along a longitudinal axis; a handle assembly operatively connected at a given end of the extending member for rotating the extending member about the longitudinal axis; and a worm being connected to the extending member, the worm being threaded and operatively moveable within a respective threaded receiving portion attached to the central portion so that a rotation of the handle causes a rotation of the worm in the threaded receiving portion driving a displacement of the side panel relative to the central portion.

In one embodiment, the handle assembly is telescopic.

In one embodiment, wherein the handle assembly comprises: a first body being tubular and rotatably secured to the frame; a second body being tubular and having a given end slidably inserted into the first body; a third body extending between a first end and a second end, the first being slidably inserted into the second body; and a handle operatively connected to the second end of the third body, the telescopic handle assembly being selectively movable between an extended position and a retracted position.

In one embodiment, the handle assembly is biased into the retracted position.

In one embodiment, the handle assembly comprises a first spring received within the second body and a second spring received within the third body, the first and second springs biasing the handle assembly to the retracted position.

In one embodiment, the extending member comprises a worm threadingly engageable to the frame.

In one embodiment, the adjusting system comprises an electric actuator for operating the extended member.

BRIEF DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION

In the following description of the embodiments references to the accompanying drawings are by way of illustration of examples by which the invention may be practiced. It will be understood that other embodiments may be made without departing from the scope of the invention disclosed.

While the description below refers to an adjusting system for adjusting the configuration of a hospital bed, it should be understood that the adjusting system may be configured for adjusting the configuration of any adequate patient support apparatuses such as a chair, for example.

Figure 1:
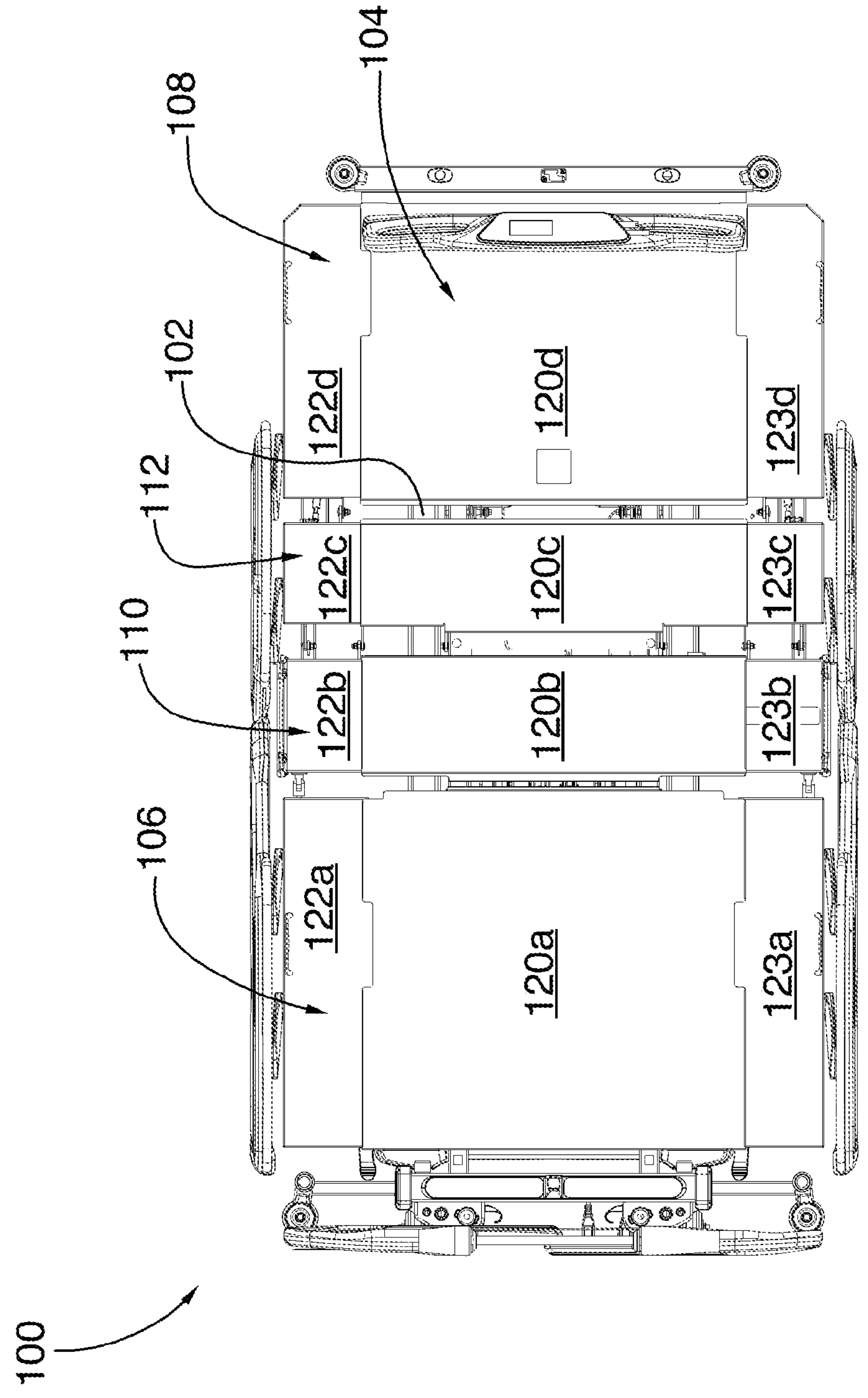
FIG. 1 is a top plan view of a hospital bed with adjustable extendable lateral panels which may integrate the adjusting systems of FIGS. 4 and 22, according to one embodiment.
Figure 2:
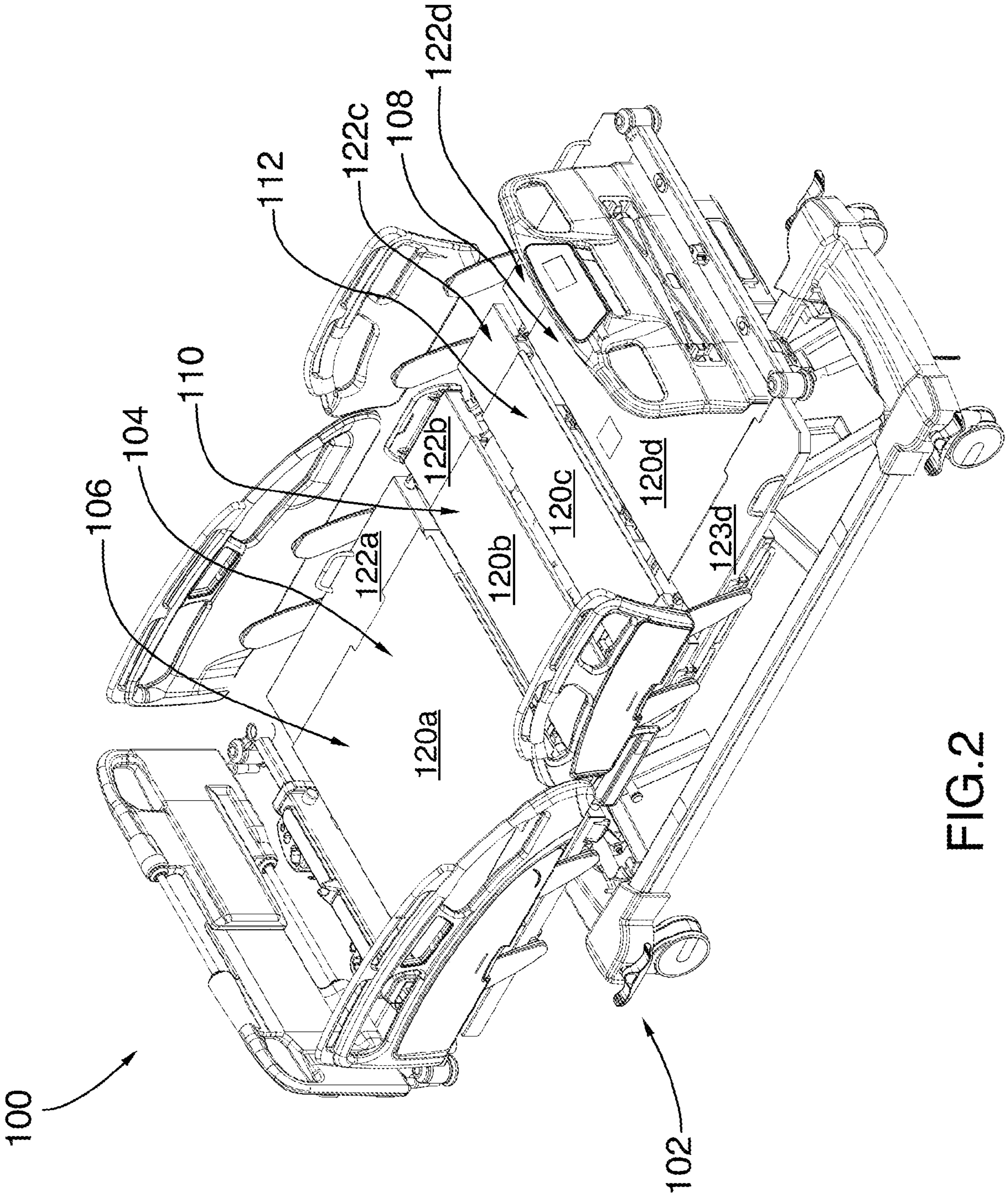
FIG. 2 is a top right perspective view of the hospital bed illustrated in FIG. 1, with the bed in an extended configuration in which the side sections of the patient support surface are in an extended position.
Figure 3:
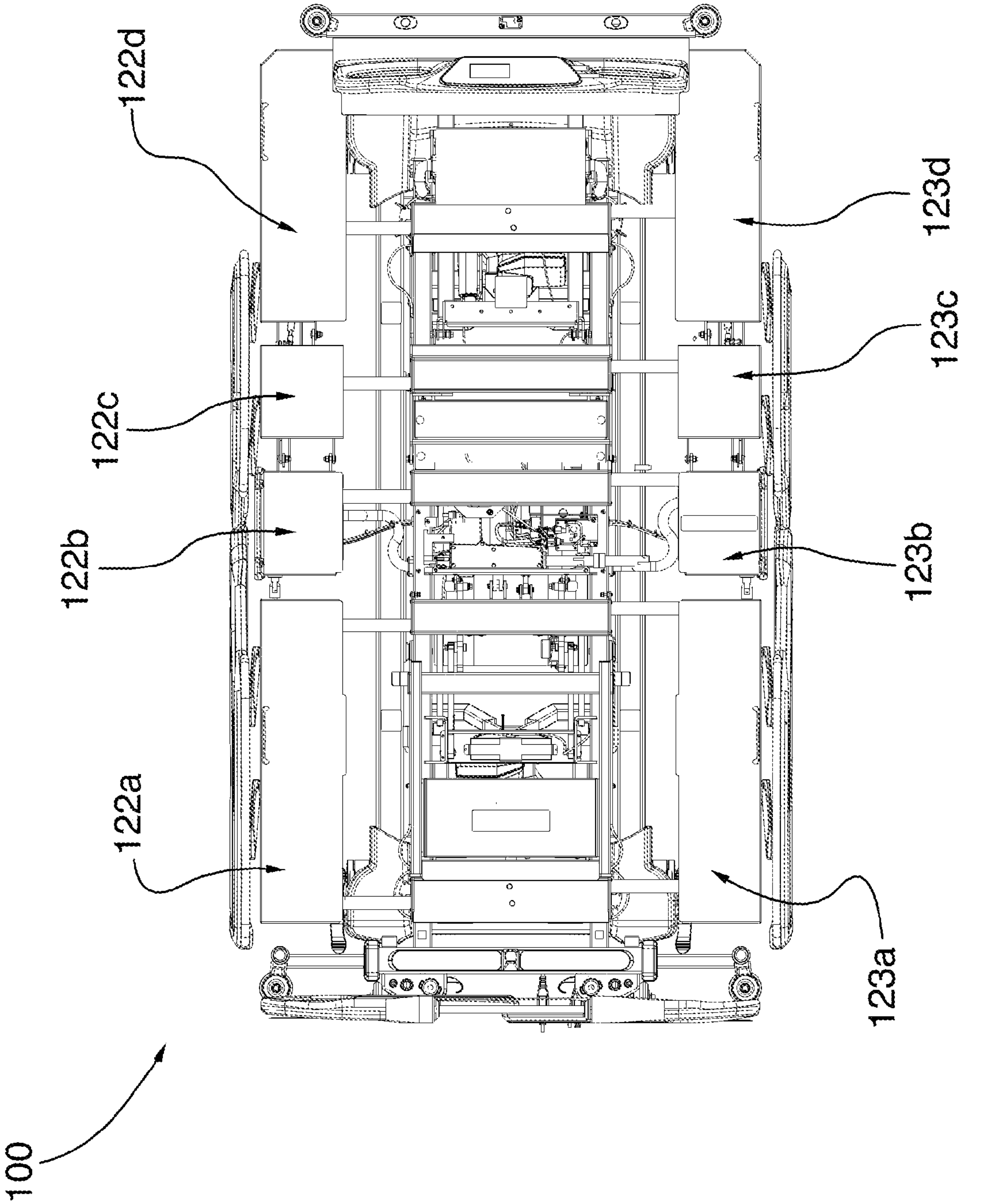
FIG. 3 is another top view of the hospital bed with adjustable width illustrated in FIG. 1 still showing the bed in an extended position but with the central panel sections removed.

Referring first to FIGS. 1 to 3, there is provided a hospital bed 100, in accordance with one embodiment. In this embodiment, the hospital bed 100 is a bariatric bed and includes a frame 102 and a patient support surface 104 supported by the frame 102 for receiving a lying surface such as a mattress, not shown, on which a patient may be placed.

In the illustrated embodiment, the patient support surface 104 includes a plurality of body support panels which are distinct from each other and are adapted to be angled relative to each other. Specifically, the patient support surface 104 includes an upper body support panel or backrest 106, a lower body support panel 108 and first and second core support panels 110, 112 located between the backrest 106 and the lower body support panel 108. More specifically, the first core support panel 110 is located adjacent the backrest 106 and the second core support panel 112 is located adjacent the lower body support panel 108.

Still referring to FIGS. 1 and 2, the width of the patient support surface 104 is adjustable. Specifically, each one of the backrest 106, the lower body support panel 108 and the first and second core support panels 110, 112 includes a central panel section **120*a*-120*d* and a pair of opposite side panel sections 122*a*-122*d* and 123*a*-123*d*, which are selectively movable towards and away from the central panel sections 120*a*-120*d* to thereby respectively decrease or increase the width of the bed 100**.

Alternatively, each one of the backrest 106, the lower body support panel 108 and the first and second core support panels 110, 112 could instead include a single side panel section (e.g. the backrest 106 would include only one of side panel section **122*a* or 123*a***).

Figure 9:
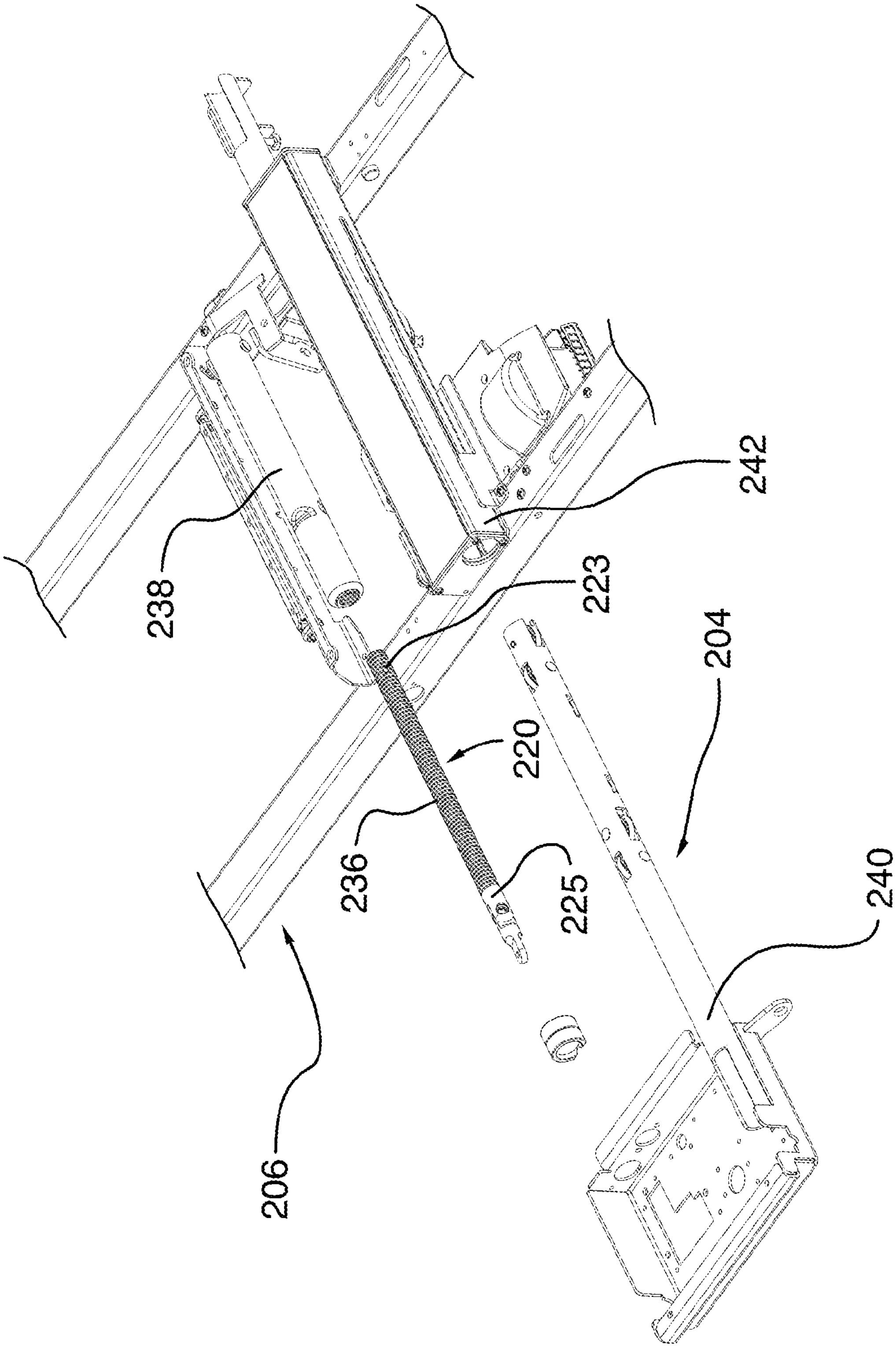
FIG. 9 is an exploded perspective view of a portion of the adjusting system of FIG. 4, illustrated in combination with a central frame and a housing mounted under the movable side panel of a bed.

In the illustrated embodiment, the side panel sections **122*a*-122*d* and 123*a*-123*d* are movably connected to the frame 102 via one or more elongated slide members 240 which are slidably received in a corresponding elongated sleeve 242 disposed transversely to the bed 100 and secured to the frame 102 (see FIGS. 3 and 9). In one embodiment, the slide members 240 could further be provided with rollers to facilitate their movement within the sleeve 242**.

In the illustrated embodiment, the bed 100 further includes a transmission assembly (not shown) for moving multiple side panel sections when a single side panel section is moved. Specifically, the transmission assembly is generally similar to the transmission assembly illustrated and disclosed in International PCT Publication No. WO2017/051386, the specification of which is incorporated herein by reference.

Figure 4:
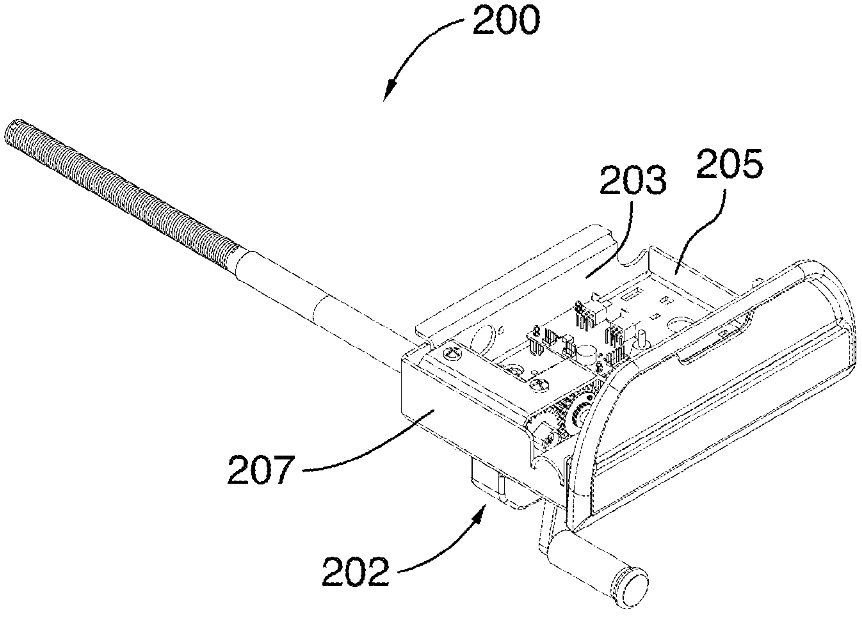
FIG. 4 is a top perspective view of an adjusting system for adjusting a configuration of a bed, according to one embodiment of a first aspect.
Figure 5:
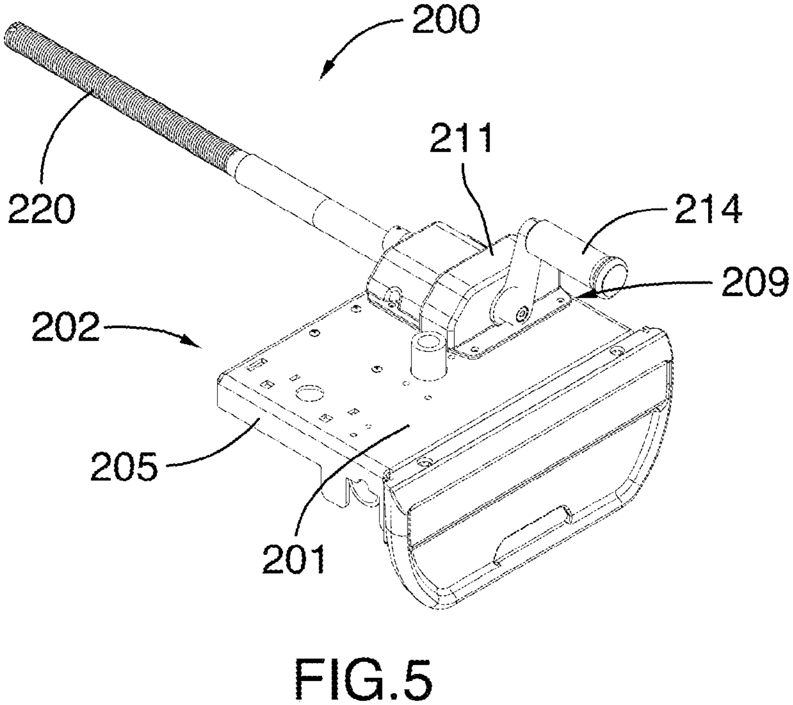
FIG. 5 is a bottom perspective view of the adjusting system of FIG. 4.
Figure 6:
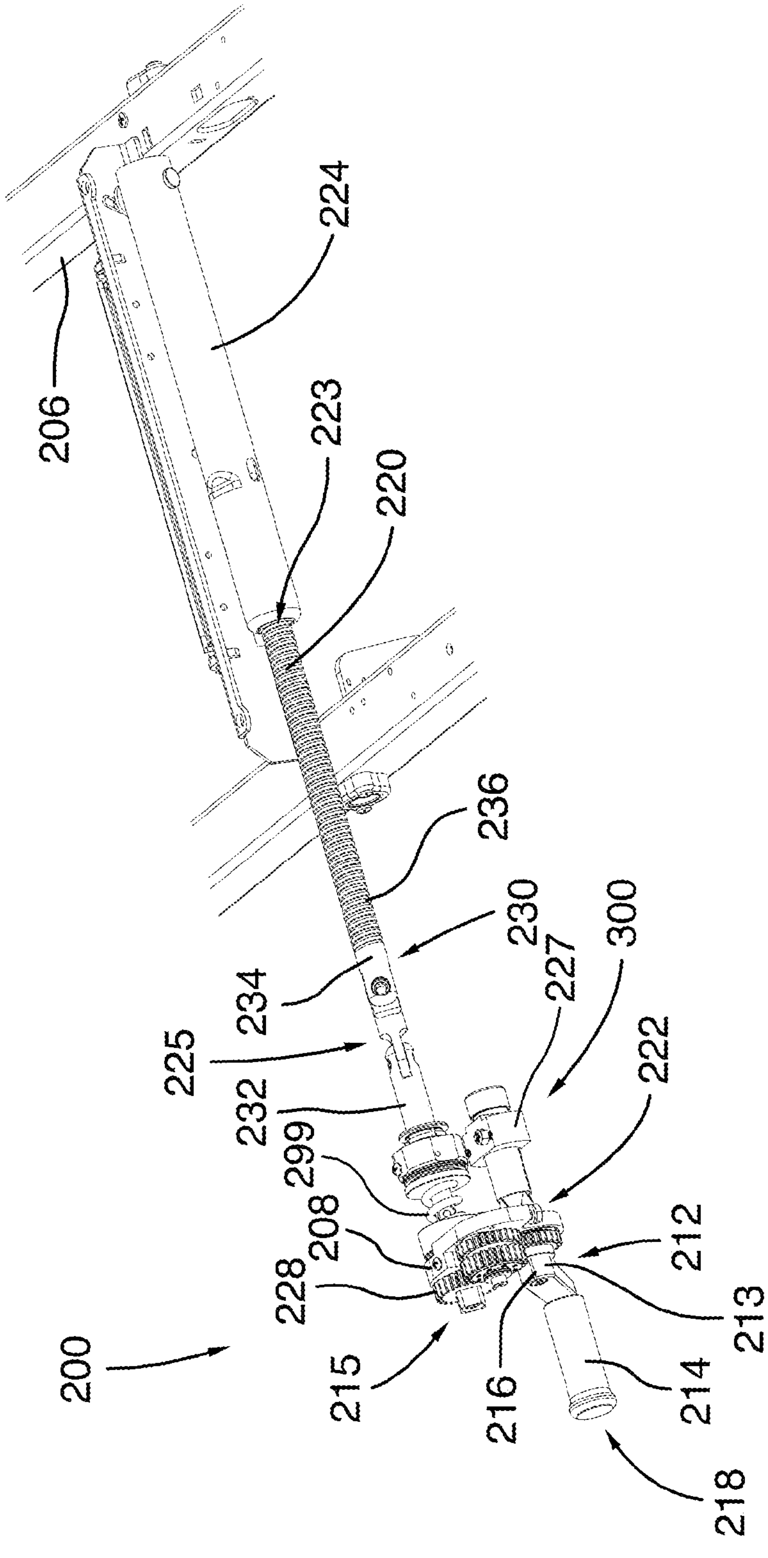
FIG. 6 is a top perspective view of the adjusting system shown in FIG. 4, mounted on the central frame of a bed, according to one embodiment.

To allow adjustment of the side panel sections **122*a*-122*d* and 123*a*-123*d* relative to the frame, an adjusting system 200 is provided. Referring now to FIGS. 4 to 6, one embodiment of an adjusting system 200 is illustrated. Adjusting system 200 is for adjusting a configuration of any adequate patient support apparatus having a central portion or frame and a panel movable relative to the central frame such as bed 100**. The skilled addressee will appreciate that various other types of hospital beds could be considered, as will become apparent below.

The adjusting system 200 is configured to be mounted to a side panel section (e.g. side panel section **123*b*), and to connect this side panel section 123*b* to the frame 102 of the bed 100 (best shown in FIG. 6), while allowing manual operation of the adjusting system 200. Accordingly, in one embodiment, the adjusting system 200 comprises a housing 202 secured underneath the side panel section 123*b* of the bed 100 (see FIG. 5), a clutch assembly 222 mounted in the housing 202, as well as a handle portion 214 having a first end 216 engaging the clutch assembly 222 inside the housing 202, as well as an outer end 218 extending outwardly from the housing 202 for allowing an operator to manually operate the adjusting system 200. Also comprised in the adjustment system 200 is a worm 220 having a first end 223 operatively coupled to an elongated tube 224 fixedly connected to the frame 102 of the bed 100, and a second, opposed end 225 engaging a connecting shaft 232 operatively coupled to the clutch assembly 222 of the adjusting system 200**, as it will be described in greater details below.

Referring more specifically to FIGS. 4 and 5, in the illustrated embodiment, the housing 202 is secured to the side panel section **123*b* and comprises a bottom wall 201 and flanged peripheral walls 203, 205, 207 extending perpendicular to the bottom wall 201. Defined in the bottom wall 201 of the housing is an opening 209 which can be covered with a removable clutch cover 211. When the housing 202 is secured to the side panel section 123*b*, the bottom and peripheral walls 201, 203, 205, 207 and the clutch cover 211 of the housing 202, together with the side panel section 123*b*, defines a chamber for receiving therein the clutch assembly 222 and electronic components. In one embodiment, the housing 202 is secured to the side panel section 123*b* using threaded fasteners, for instance nuts and bolts. Likewise, the removable clutch cover 211 is secured to the bottom wall 201 of the housing 202 with threaded fasteners. While in this embodiment threaded fasteners are used, it will be understood that the clutch cover 211 and housing can be mounted to the side panel section 123*b*** differently, for instance by using rivets, glue or by welding.

Figure 7:
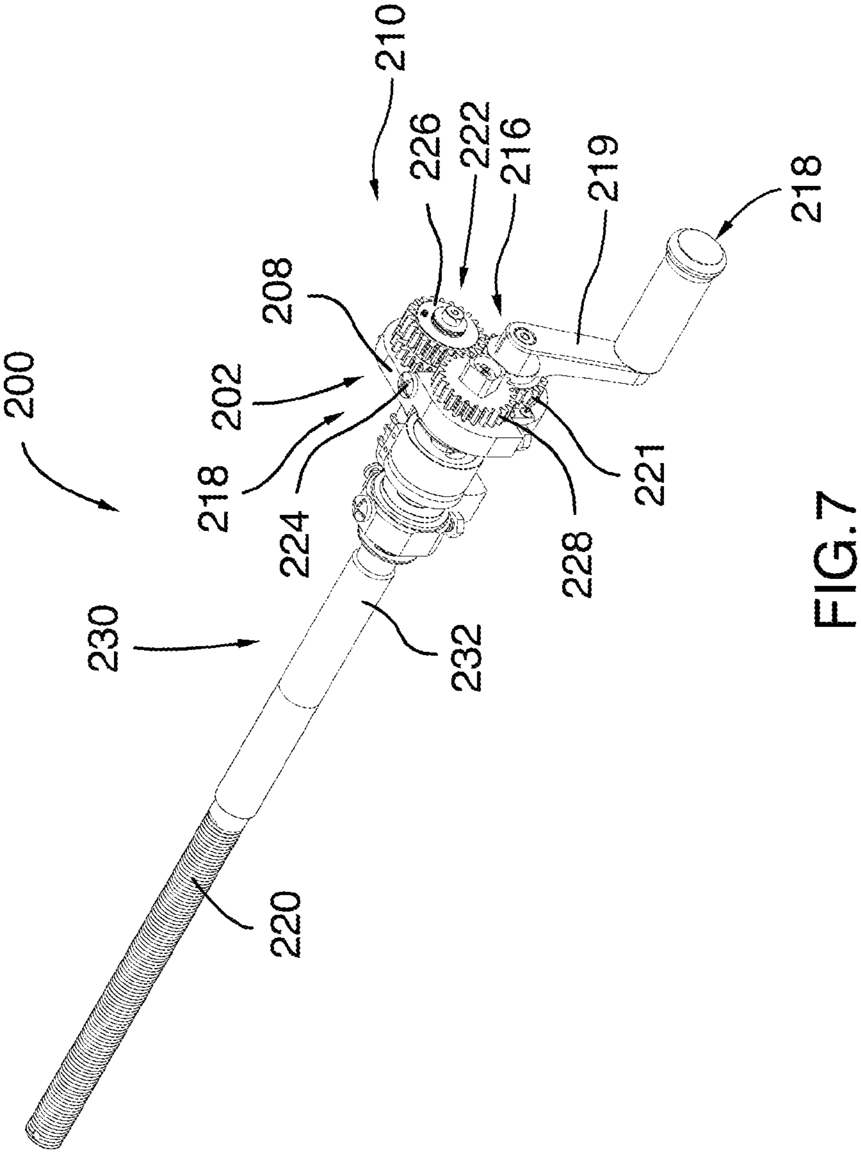
FIG. 7 is another top perspective view of the adjusting system of FIG. 4 showing a gear assembly of the adjusting system.
Figure 8:
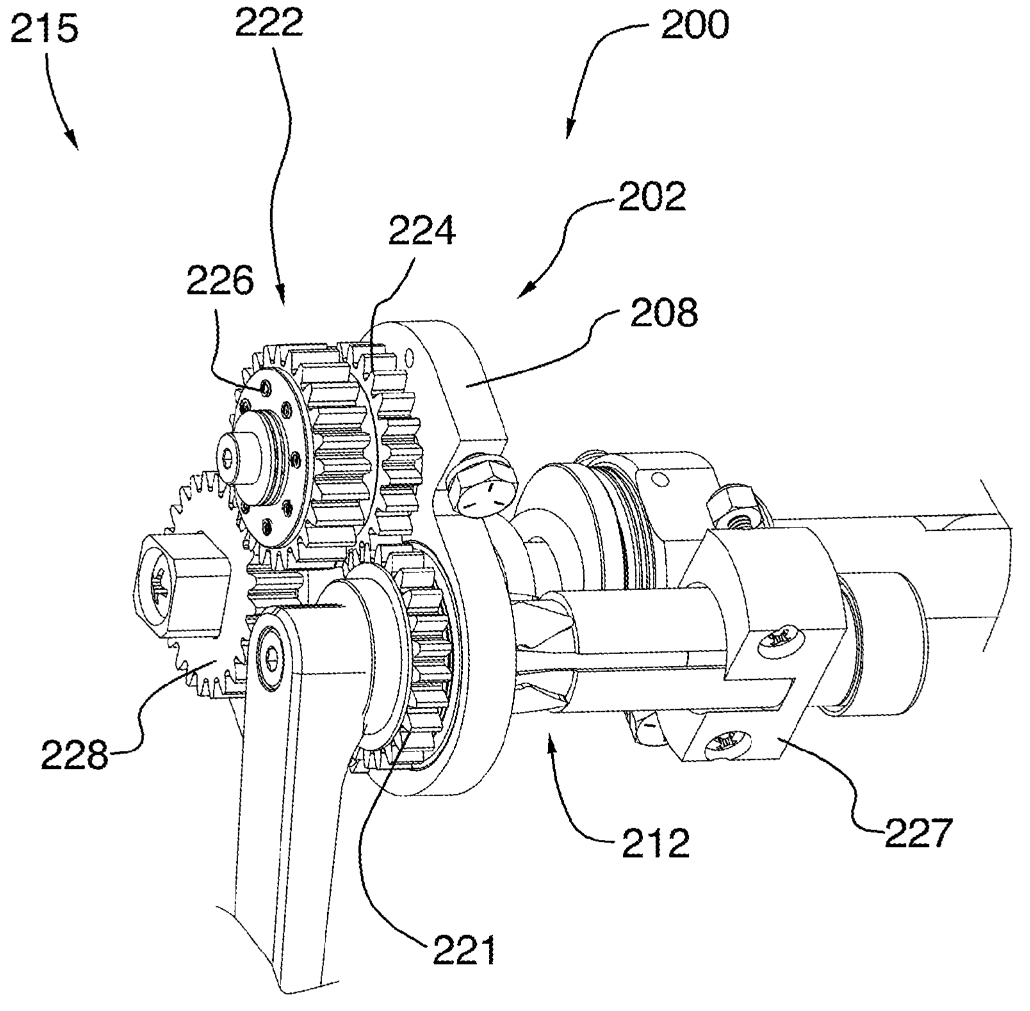
FIG. 8 is a side perspective view of the gear assembly of the adjusting system shown in FIG. 7.

Provided in the housing 202 is the clutch assembly 222. With reference to FIGS. 6 to 8, the clutch assembly 222 comprises a mounting bracket 208 secured to the bottom wall 201 of the housing 202 and a gear assembly 215 rotatably mounted to the mounting bracket 208 and a connection assembly 246. More specifically, the gear assembly 215 comprises first gear 221, second gear 224, third gear 226 and fourth gear 228 operatively coupled to the worm 220, all gears 221, 224, 226 and 228 being rotatably secured to the mounting bracket 208.

In one embodiment, the first gear 221 comprises a spur gear wheel, i.e. a gearwheel provided with teeth projecting orthogonal to the wheel's axis and circumferentially from the wheel, that is rotatably mounted to the mounting bracket 208. In the illustrated embodiment, the mounting bracket 208 comprises an aperture coaxial with the first gear 221 axis to allow a shaft 212 to be mounted therethrough and rotatably mount the first gear 221 to the mounting bracket 208, although other arrangements may be considered. As the first gear 221 is coupled to the handle portion, it can be designated as a "handle gear".

In the illustrated embodiment, each of the second and third gears 224 and 226 comprises a spur gear wheel, i.e. a gearwheel provided with teeth projecting orthogonal to the wheel's axis and circumferentially from the wheel, that is mounted to the mounting bracket 208.

The second gear 224 is operatively connected to the first gear 221 so that the rotation of the first gear 221 drives a rotation of the second gear 224. In one embodiment, as illustrated, the first and second gears 221 and 224 are coplanar on the mounting bracket 208 and are mounted side by side such that the teeth of the first gear 221 engage with the teeth of the second gear 224.

The second and third gears 224 and 226 are also operatively connected together. In one embodiment, as illustrated, the second and third gears 224 and 226 are mounted coaxially on the mounting bracket 208 and can rotate together about the same rotation axis. As better shown in FIG. 8, there is no direct contact between the first and the third gears 221 and 226. Rather, the first gear 221 drives the second gear 224 and this second gear 224 drives the third gear 226 as detailed below.

The second and third gears 224 and 226 are particularly operatively connected together through the connection assembly 246 (see FIGS. 11A and 11B) as will be described in greater detail below.

In the illustrated embodiment, the fourth gear 228 has a spur gear wheel that is mounted to the mounting bracket 208. The fourth gear 228 is operatively connected to the third gear 226 so that rotation of the third gear 226 drives a rotation of the fourth gear 228. In one embodiment, as illustrated, the third and fourth gears 226 and 228 are coplanar on the mounting bracket 208 and are mounted side by side such that the teeth of the third gear 226 engage with the teeth of the fourth gear 228. There is no direct contact between the fourth gear 228 and the first and second gears 221 and 224. Rather, rotation of the fourth gear 228 is only driven by rotation of the third gear 226. As the fourth gear 228 is operatively coupled to the worm 220, it can be designated as a "worm gear".

Figure 11A:
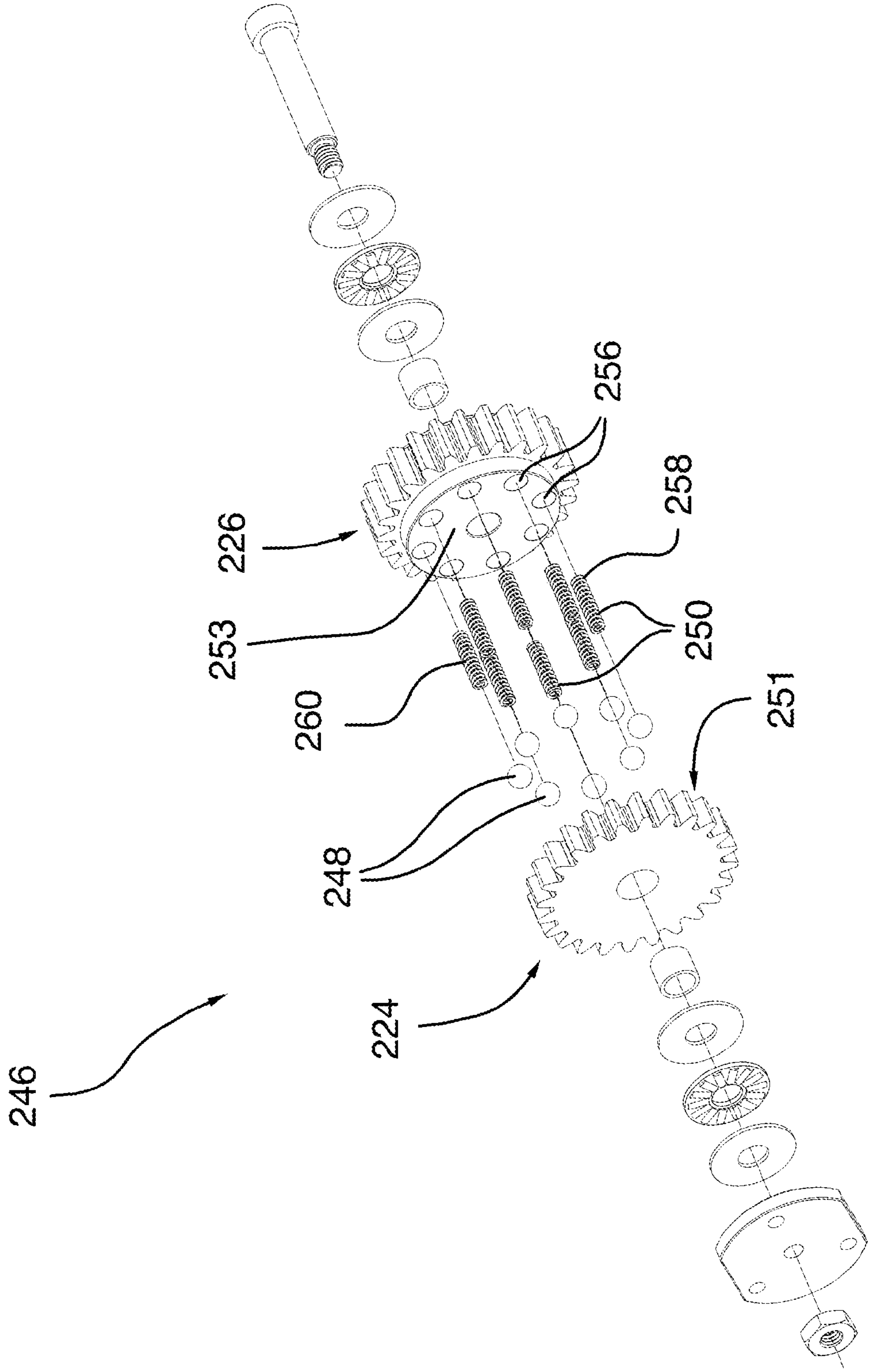
FIG. 11A is an exploded perspective view of a clutch assembly of an adjusting system, according to one embodiment.
Figure 11B:
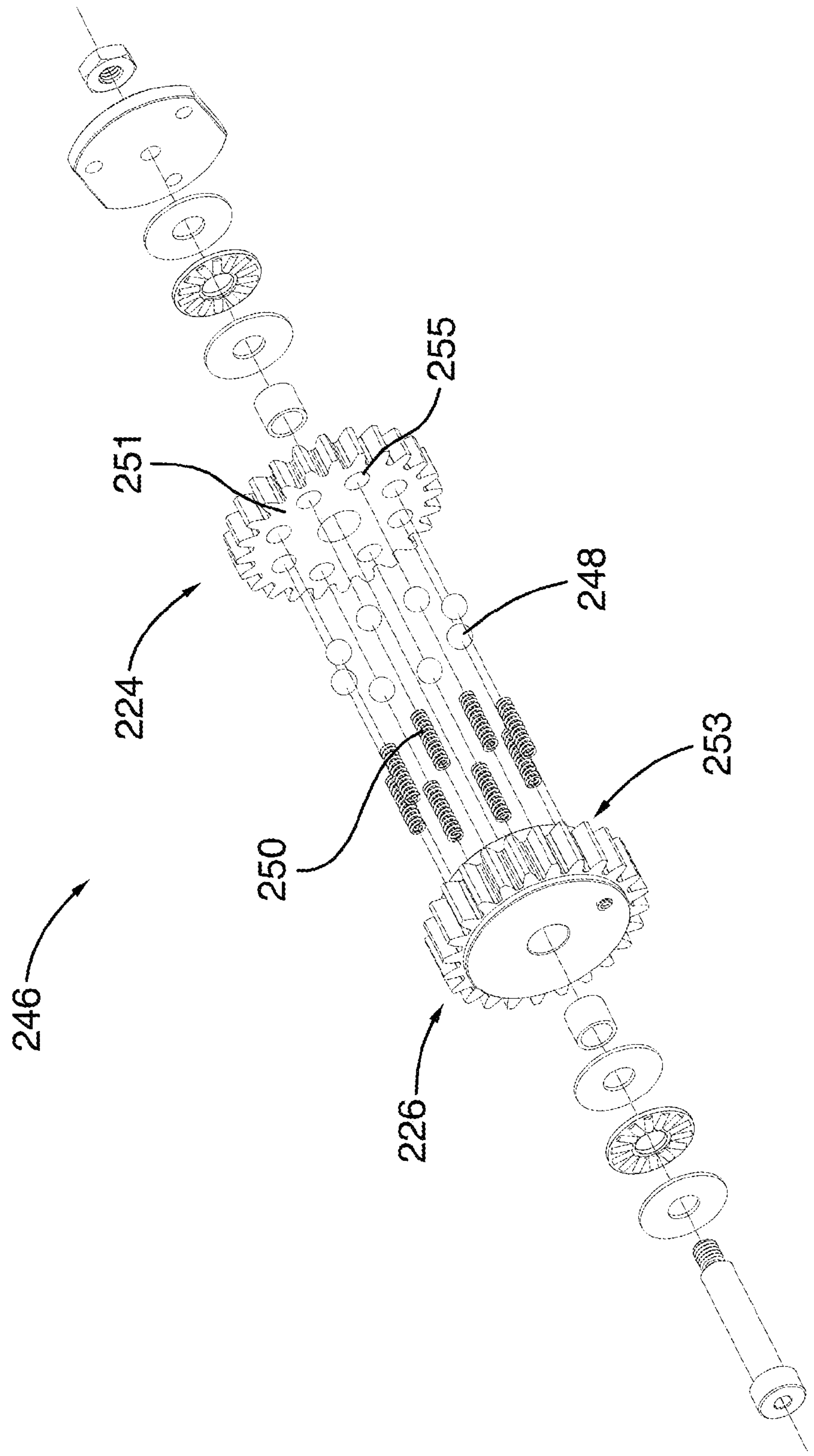
FIG. 11B is an exploded perspective view of a clutch assembly of an adjusting system as in FIG. 11A but from the opposing angle, according to one embodiment.
Figure 12:
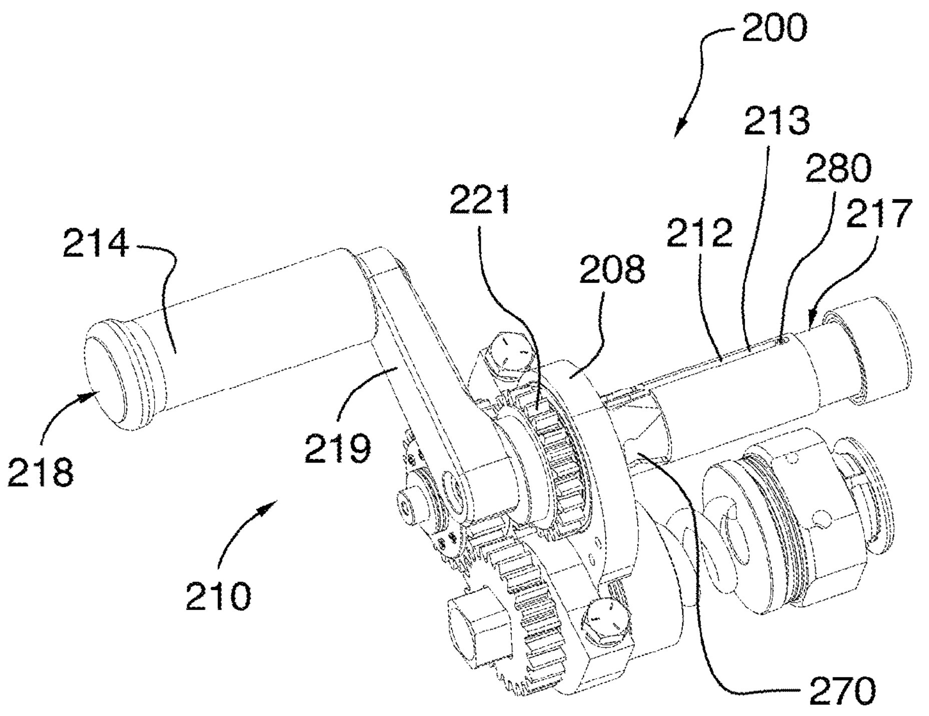
FIG. 12 is a perspective view of an adjusting system for adjusting a configuration of a bed, according to one embodiment.
Figure 13:
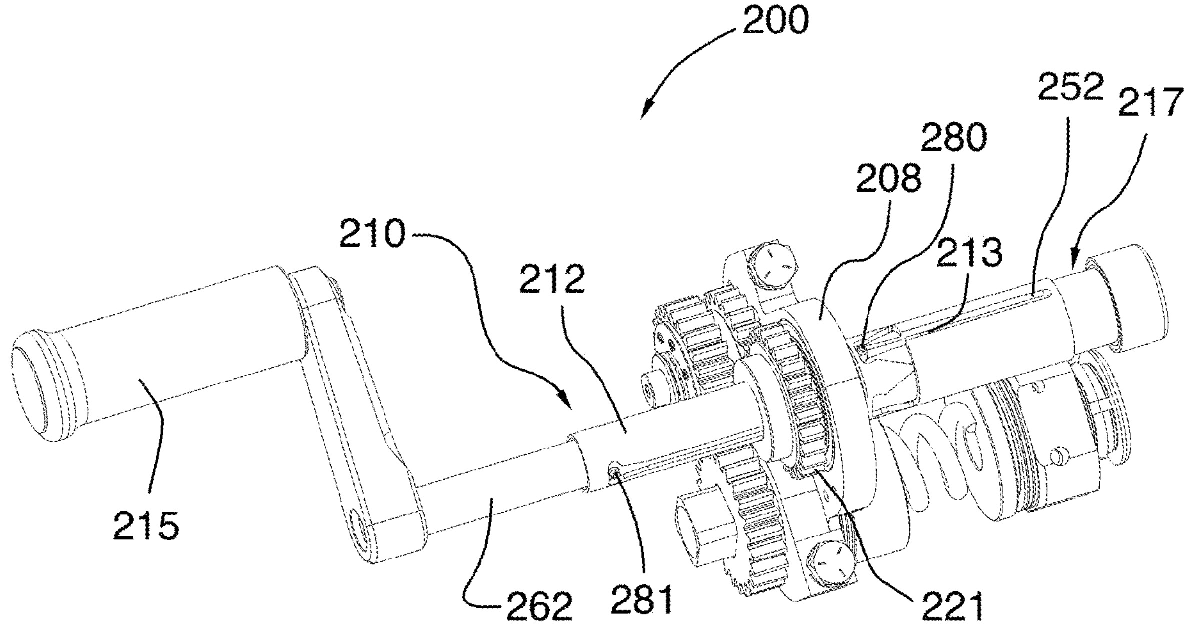
FIG. 13 is another perspective view of the adjusting system of FIG. 12 with the handle a telescopic handle shown in an extended position.

FIGS. 11A and 11B illustrate one embodiment for the connection assembly 246 used for connecting the second gear 224 and the third gear 226 of the clutch assembly 222. The purpose of the connection assembly 246 is to disengage the second and third gears 224, 226 if resistance builds up in the connection assembly 246. This mechanism will now be described. The connection assembly 246 comprises a plurality of balls 248 and springs 250. and ball recesses 255, 257 into which are received balls 248. In the preferred embodiment, there are a plurality of balls 248, recesses 255, 257 and springs 250 spaced concentrically on each gear 224, 226. However it is understood that the arrangement may be non-symmetric and that the connection assembly 246 may comprise a single ball 248, spring 250 and pair of recesses 255, 256. The facing surface 252 of the second gear 224 is provided with a plurality of corresponding ball recesses 255 slightly smaller than the dimension of the corresponding ball 248 to define a ball seat. When the balls 248 rest in their corresponding ball seats, a portion of the ball 248 protrudes from the facing surface 252 of the second gear 224. The facing surface 254 of the third gear 226 is provided with a plurality of corresponding longitudinal recesses 256, each devised to receive a first end 258 of a corresponding spring 250 and to house the spring therein. The second end 260 of the spring 250 thereby applies pressure to push a corresponding ball 248 into its corresponding ball seat. Thus, once the second and third gears 224, 226 are mounted together onto the mounting bracket 208 of the frame 202, as shown in FIGS. 7 and 8, each ball 248 engages in a respective ball seat and a respective facing recess 256 in the third gear 226, while the spring 250 applies pressure onto it. A rotation of the second gear 224 will thereby drive a rotation of the third gear 226 through the balls 248 as the balls 248 are engaged in both recesses 255, 256.

However, if the handle portion 214 is continuously rotated in the fully extended or the fully retracted mode, the worm 220 resists further rotation conducive to movement beyond the maximum or minimum positions. This resistance builds up in the third gear 226. An increasing amount of force must thereby be applied to the handle portion 214 by the operator to overcome the resistance provided by the worm 220. As the operator continues to increase the pressure applied, a threshold stress value is reached. The force applied by the springs 250 onto the balls 248 to keep them engaged in the recesses 255 of the second gear 224 is then overcome by the lateral stress resulting from the high forces applied by the operator on the handle portion 214. At this point, the balls 248 compress the springs 250 and slip out of their respective recesses 255 and are proportionally received in recesses 256, resulting in the second and third gears disengaging from one another. The second gear 224 will thus continue to turn with operation of the handle portion 214, while the third gear 226 remains virtually static. The second gear 224 thereby 'slips' against the third gear 226. Once the handle portion 214 is rotated in the opposing direction, however, the balls 248 no longer apply sufficient pressure to compress the springs 250 and the springs reexert a force to push the balls 248 into respective recesses 255, thereby re-engaging the third gear 224 with the second gear 224 and allowing transfer of rotation from the handle portion 214 to the worm 220. The clutch assembly 222 therefore prevents undue force applied on the handle portion 214 from being transferred and causing damage to the worm 220 or other components in the maximum or minimum positions, or when an external force otherwise prevents movement of the side panel 123*b*.

As it should be apparent to the skilled addressee, the level of the threshold force is determined according to the strength of the specific springs used in the assembly.

Referring now to FIGS. 6, 7 and 12 to 17, the adjusting system 200 is provided with a telescopic handle assembly 210. The telescopic handle assembly 210 comprises a tubular body 217 rotatably secured to a second mounting bracket 227 in the housing 202 and a telescopic shaft 212 having an outer end 213 slidably inserted into the tubular body 217. The telescopic shaft 212 further receives a first end of a cylindrical body 262 on a second end opposed to the outer end 213. The telescopic handle assembly 210 also has a handle or grip portion 214 operatively connected to a second end of the cylindrical body 262 through a cam portion 219. The handle portion 214 extends parallel to the rotation axis of the telescopic shaft 212 allowing a user to operate the adjusting mechanism 200, while the cam portion 219 extends perpendicular to the rotation axis of the telescopic shaft 212 and connects the handle portion 214 to the remainder of the telescopic handle assembly 210. The telescopic handle assembly 210 is selectively movable between an extended position corresponding to a maximal length for the telescopic handle assembly shown in FIGS. 13 and 15, and a retracted position corresponding to a minimal length for the telescopic handle assembly shown in FIGS. 12 and 16. The telescopic handle assembly 210 comprises a shaft 212 operatively coupled to the first gear 221 of the clutch assembly 222 so that a rotation of the shaft 212 may drive a rotation of the first gear 221. As it will be detailed hereinafter with reference to FIGS. 18 and 19, the telescopic handle assembly 210 is biased into the retracted position.

In one embodiment, the tubular body 217 is mounted coaxially to the first gear 221, on a first side thereof, the telescopic shaft 212 extends coaxially through the first gear 221 while the handle 214 extends on a second side of the first gear 221. The first gear 221 is further provided with a toothed ring 270 fixedly connected to the first gear 221 around its rotating axis on the first side. The tubular body 217 has an elongated longitudinal groove 252 adapted for slidably receiving therein a pin 280 projecting outwardly from the telescopic shaft 212, proximate its first end. Thus, when the telescopic handle assembly 210 is retracted, the telescopic shaft 212 slides inside the tubular body 217 and through the toothed ring 270 of the first gear 221, with the pin 280 travelling along the elongated longitudinal groove 252 of the tubular body 217. When the telescopic handle assembly 210 is moved to the fully extended position, the pin 280 of the telescopic shaft 212 engages the toothed ring 270, and a rotation of the telescopic shaft 212 through the handle portion 214 drives a rotation of the first gear 221.

Referring back to FIGS. 6 and 7, the fourth gear 228 rotatably secured to the frame and operatively connected to the first gear so that a rotation of the first gear 221 drives a rotation of the fourth gear 228. In the illustrated embodiment, the first gear 221 is connected to the fourth gear 228 through the clutch assembly 222, but the skilled addressee will appreciate that with reference to the description of the telescopic handle assembly 210 above and FIGS. 12 to 14, the clutch assembly 222 may be replaced or omitted. For example, the first gear 221 and the fourth gear 228 may be coplanar on the mounting plate and mounted side by side such that the teeth of the first gear 221 engage with facing teeth of the fourth gear 228. Alternatively, the system could also remove use of the gears entirely by directly coupling the telescopic handle assembly 210 to the worm 220.

The adjusting system 200 is also provided with a connection body 230 secured to the fourth gear 228 so that the rotation of the fourth gear 228 drives a rotation of the connection body 230. In the illustrated embodiment, the connection body 230 is an elongated body comprising a worm 220 having a threaded portion 236 and a second end 225 fixedly coupled to a connecting shaft 232. In the preferred embodiment, the worm 220 is connected to the connecting shaft 232 using a bolt and nut, though other arrangements may be possible. For example, the worm 220 can be welded or riveted to the connecting shaft 232, as well as being connected directly to the fourth gear 228, removing the need for the connecting shaft 232. As it should be apparent, applying a rotational movement to the cylindrical shaft 212 through the handle portion 214 applies a rotational movement to the connection body 230 through the clutch assembly 222. The connection body 230 is operatively connectable to the central frame of the bed so that a rotation of the connection body 230 drives a displacement of the side panel **123*b* relative to the central frame 206. The second end 223 of the worm 220 is threaded and mounted inside a threaded elongated tube 238 fixedly attached to the central frame of the bed, so that rotation of the worm 220 inside the threaded elongated tube 238 causes lateral movement of the side panel 123*b***.

Figure 15:
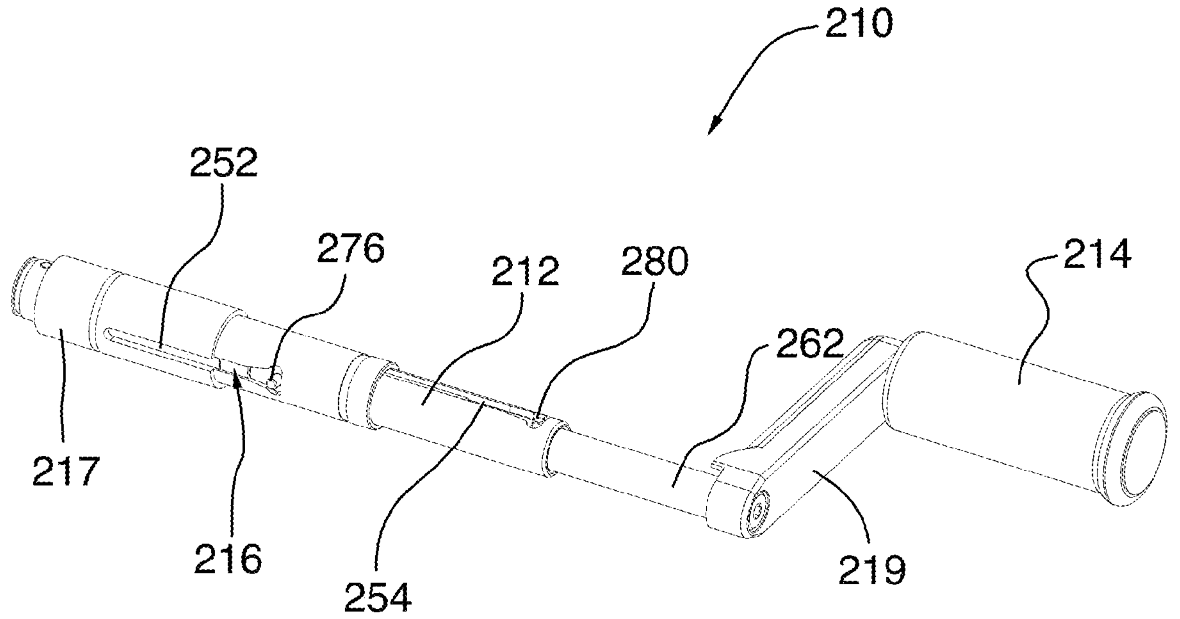
FIG. 15 is an elevation perspective view of a telescopic handle assembly in an extended position, according to one embodiment.
Figure 16:
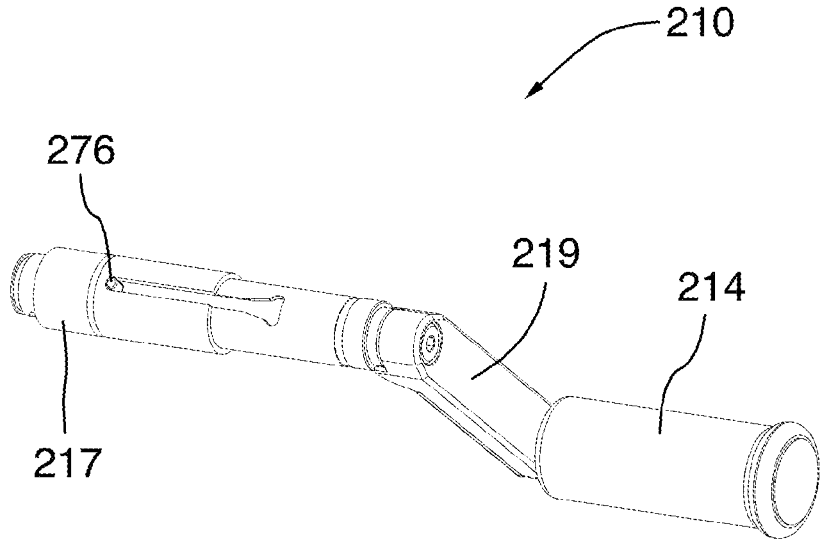
FIG. 16 is an elevation perspective view of the telescopic handle assembly of FIG. 15, in a retracted position.
Figure 17:
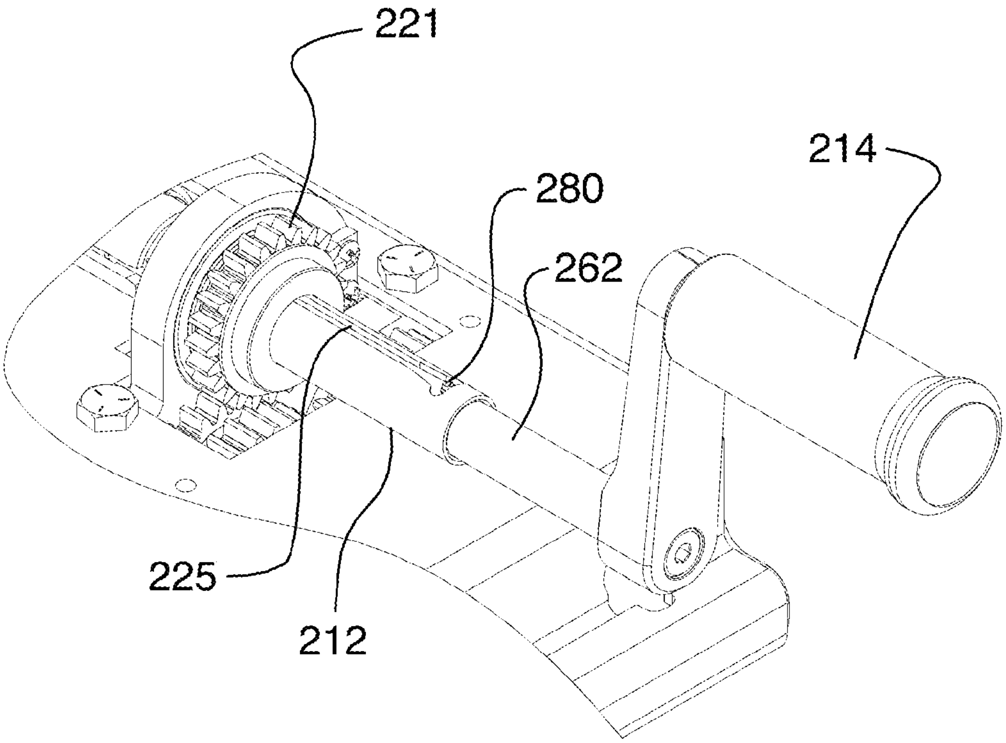
FIG. 17 is an elevation perspective view of the telescopic handle assembly of FIG. 15, mounted with the first gear of the adjusting system, according to one embodiment.

As better shown in FIGS. 15 and 17, in one embodiment, each of the two elongated grooves 252 and 254 has an end that is T-shaped. In other words, the grooves 252, 254 has an elongated longitudinal portion which ends with an enlarged portion extending laterally on the corresponding body. In a further embodiment, the T-shaped end of the grooves has rounded angled walls defining a continuous smooth surface between the elongated portion and the lateral portion to thereby provide a smooth sliding of the corresponding pin in the corresponding groove. When the handle portion 214 is released, the T-shaped end will enable a sliding of the corresponding pin from the T-shaped portion into the corresponding groove to ensure a suitable retraction of the handle assembly. Inversely, while the handle portion 214 is operated by an operator in the extended position, the T-shaped end of the grooves 252, 254 house a respective pin 276, 280 therein. While the handle is held or rotated by an operator, the T-shaped section of the grooves 252, 254 prevents longitudinal movement of the corresponding pin along the respective groove 252, 254. In this way, the T shape portion acts on the pins 276, 280 to counter the retractive force exerted by the springs 272, 275 so that the operator does not need to resist the retraction force (as would be the case if there were no T section).

It will be understood that other locking mechanisms may be possible, for example a further small groove may be incorporated into the end of the T sections to allow a respective pin 276, 280 to be locked therein (e.g. bayonet mount), keeping the handle assembly 210 in the extended position without an operator.

As it should be apparent, when the handle 214 is moved in its extended position and then rotated, the first cylindrical body 262 is rotated with the handle portion 214. The pin 280 of the first cylindrical body 262 extends in the T-shaped end of the groove 254 of the telescopic shaft 212 and drives a rotation of telescopic shaft 212. Since this telescopic shaft 212 is in its extended position, its corresponding pin 280 extends in the T-shaped end of the groove 252 of the tubular body 217 and drives a rotation of the tubular body 217.

Figure 18:
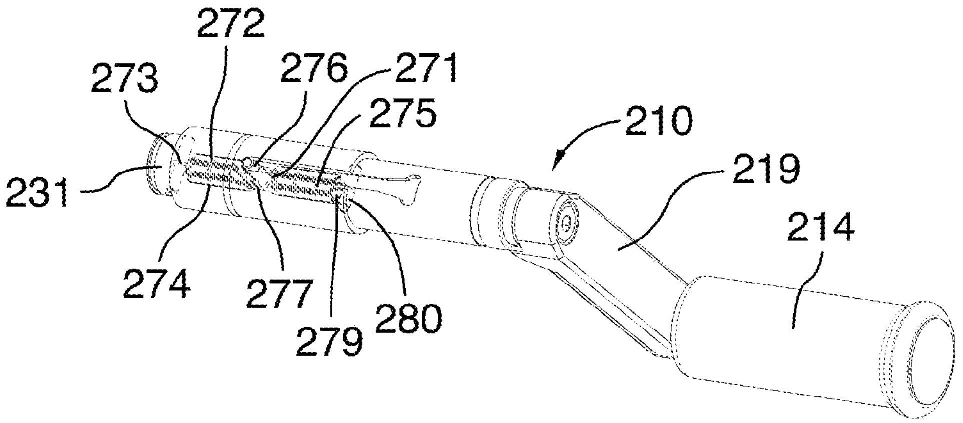
FIG. 18 is a schematic perspective view of the telescopic handle assembly of FIG. 15 showing biased elements (springs) mounted therein, the telescopic handle assembly shown in a retracted position.
Figure 19:
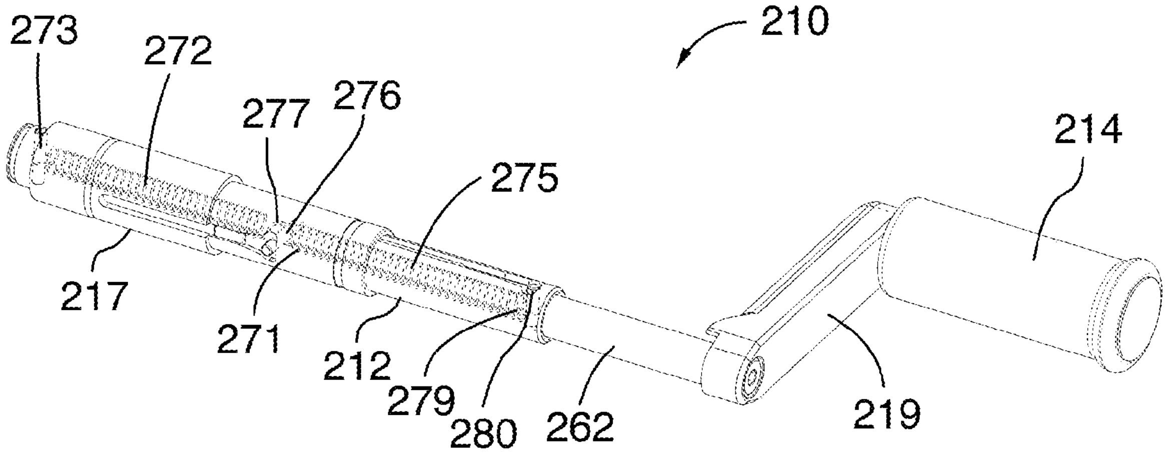
FIG. 19 is a schematic perspective view of the telescopic handle assembly of FIG. 15 showing biased elements (springs) mounted therein, the telescopic handle assembly shown in an extended position.

Referring now to FIGS. 18 and 19, the telescopic handle assembly 210 is further provided with biasing elements for biasing the telescopic handle assembly 210 into the retracted position. In one embodiment, a first linear spring 272 is mounted inside the tubular body 217 and has a first end 273 attached to the first end 231 of the tubular body 217 distal from the mounting bracket 208. The second end 277 of the linear spring 272 is attached to the pin 276 of the telescopic shaft 212. A second linear spring 275 is mounted inside the telescopic shaft 212 and has a first end 271 attached to the pin 276 of the telescopic shaft 212. The second end 279 of the second linear spring 275 is attached to the pin 280 of the first cylindrical body 262 and is mounted therein.

Figure 14:
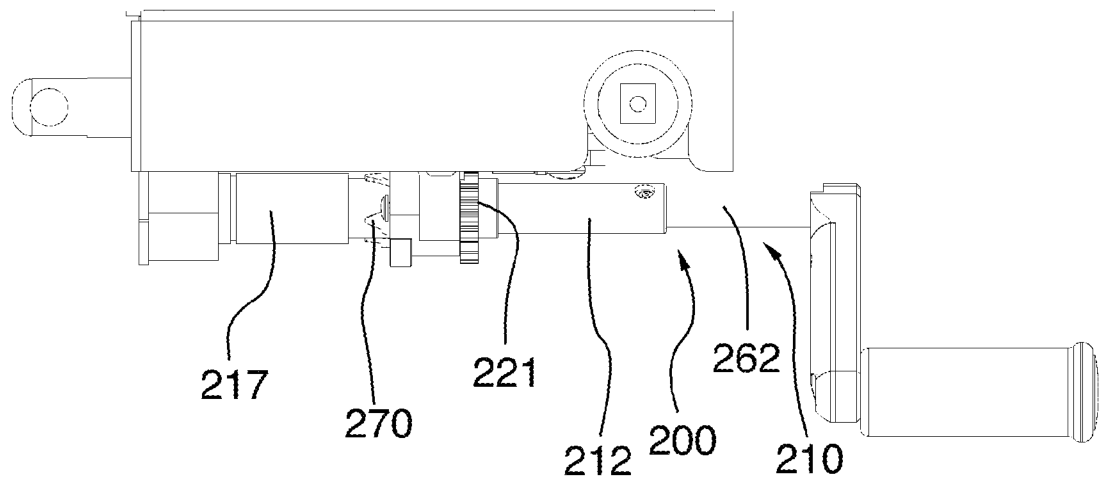
FIG. 14 is a side view of the adjusting system of FIG. 12 mounted on a lateral panel of a bed, the telescopic handle assembly shown in an extended position.
Figure 20:
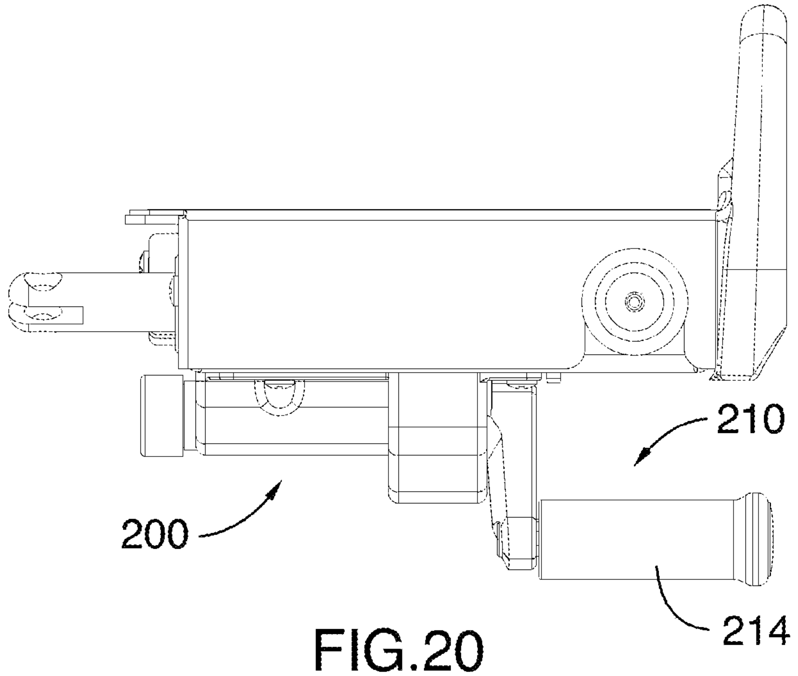
FIG. 20 is a side view of an adjusting system mounted on a lateral panel of a bed according to one embodiment, the telescopic handle assembly shown in a retracted position.
Figure 21:
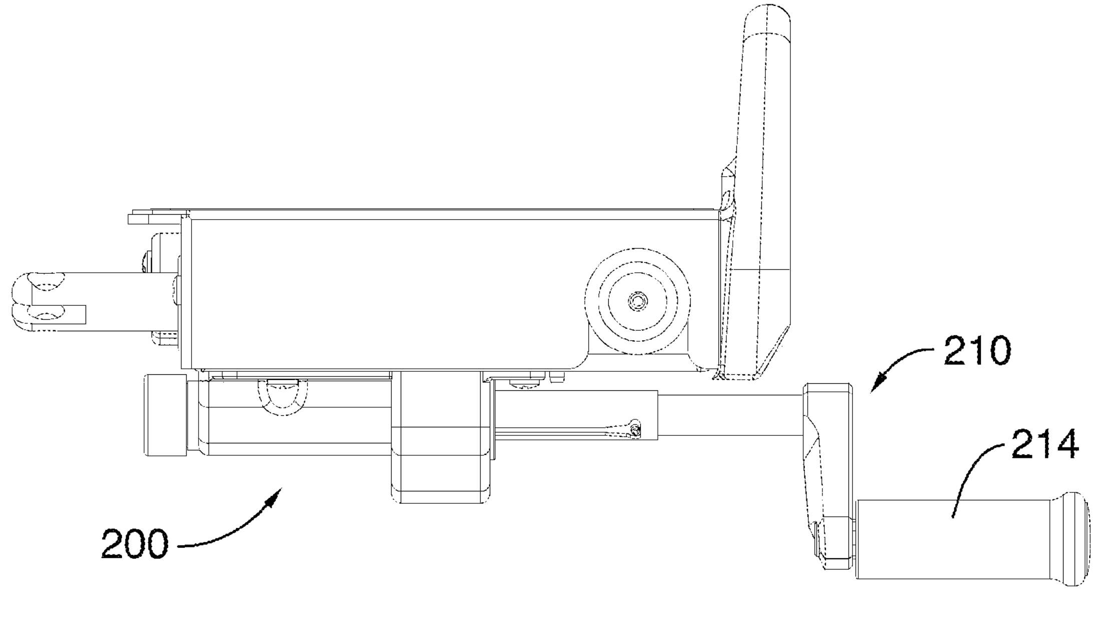
FIG. 21 is a side view of the adjusting system shown in FIG. 20, the telescopic handle assembly shown in an extended position.

FIGS. 14, 20 and 21 show the adjusting system 200 with a telescopic handle assembly 210 mounted onto the side panel **123*b* of a bed 100. As illustrated, when the telescopic handle assembly 210 is fully retracted, the handle portion 214 extends below the side panel 123*b* and does not protrude out of the bed 100. When the bed 100 is to be configured, the user has first to pull the handle assembly 210 to its extended position before rotating it. In this position, the handle portion 214 protrudes outward from under the side panel 123***b* to provide a convenient use of the handle portion 214. Once the bed 100 has been configured, the user releases the handle portion 214 which will naturally return the telescopic handle assembly 210 to its retracted position due to action of the first and second springs 272, 275.

As it should now be apparent to the skilled addressee, applying a rotational movement to the elongated body 212 through the handle portion 214 controllably applies a rotational movement to the connection body 230 via the rotation of the gears 221, 224, 226 and 228. As better shown in FIG. 6 and also in FIG. 9, the connection body 230 is connectable to the worm 220 that is operatively connectable to the central frame 206 so that a rotation of the connection body 230 drives a displacement of the side panel 123*b* relative to the central frame 206 In one embodiment, the connection body 230 and the worm 220 may be integral. The second end 223 of the worm 220 is mounted inside an elongated tube 238 fixedly attached to the central frame 206 of the bed. In the preferred embodiment, the worm 220 has an external thread 236 and the elongated tube 224 has an internal thread, allowing the two to be operatively connected. Other embodiments allowing rotational motion to translate into linear movement may be evident however, including rack and pinion or other types of threaded and geared devices. FIG. 9 shows an elongated slide member 240 of the side panel 123*b* that is slidably inserted into an elongated tubular portion 242 fixed to the central frame 206. When the handle portion 214 is rotated, rotational movement is transmitted up to the worm 220 which rotates into the tube 238. Since the tube 238 is fixedly secured to the central frame of the bed, the rotation of the worm 220 within the tube 238 drives a translation of the side panel 123*b* relative to the central frame 206 of the bed.

While in the above embodiment the handle portion 214 is equipped with a telescopic shaft, it will be understood that other configurations are possible. For instance, in one embodiment, illustrated in FIGS. 4 and 5, the shaft 212 may be a non-extendable shaft directly secured with the first gear wheel axis.

Figure 10:
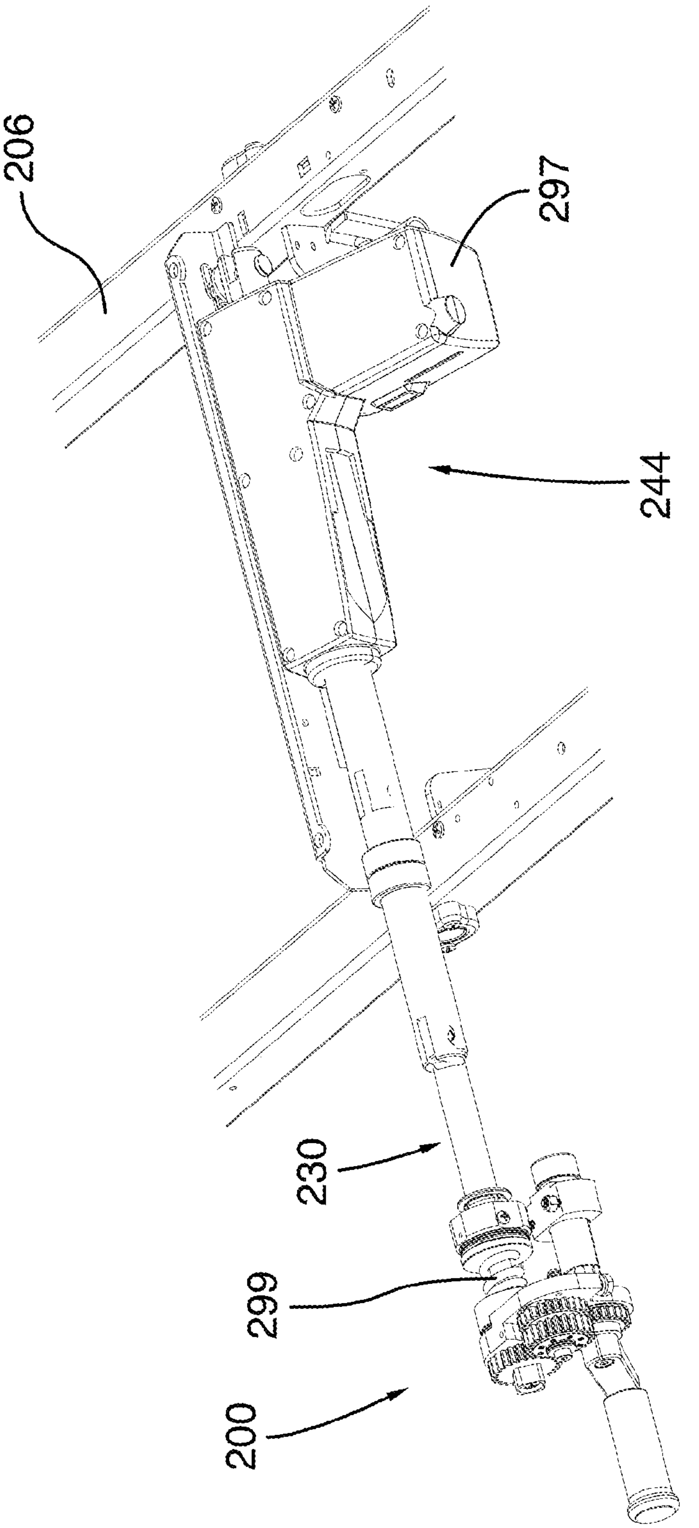
FIG. 10 is a top perspective view of another adjusting system mounted on the central frame of a bed, the adjusting system being motorized, according to one embodiment.

Referring now to FIG. 10, the adjusting system 200 may further be motorized to ease operation thereof. In this case, the worm 220 previously described could be replaced by an assembly 244 having an electrical actuator 297 comprising a male threaded screw driving a tube comprising internal threads (not shown). In this case, instead of directly connecting the connecting shaft 232 to a worm as previously described, the connecting shaft 232 is operatively connected to an electrical actuator 297. In this embodiment, the adjusting system 200 can provide two operation modes, i.e. an electric mode or a manual mode.

As previously mentioned and as it should become apparent now, when the handle portion 214 is rotated to move the side panel section 123*b* from one of the retracted and extended positions to the other, the first gear 221 is rotated, which drives a rotation of the second gear 224, this second gear 224 drives the rotation of the third gear 226 and this third gear 226 drives the rotation of the fourth gear 228 to rotate the worm 220 into the elongated tube 238 and thus displace the side panel section 123*b* parallel to the worm 220 with respect to the central frame 206.

The adjusting system 200 may additionally comprise a shock absorption assembly 299 configured to absorb external forces from, for example, the adjusting system 200 being operated while the lateral panel pushes against a wall or when a patient's weight is placed on the side panel 123*b*. The shock absorption assembly is further described in WO 2019/087123, which is incorporated by reference herein.

As it should be appreciated, the first and second aspects of the invention may be combined according to various arrangements. For example, the adjusting system 200 provided with the telescopic handle assembly 210 may also be motorized to drive the worm 220, as previously described with reference to FIG. 10.

Figure 22:
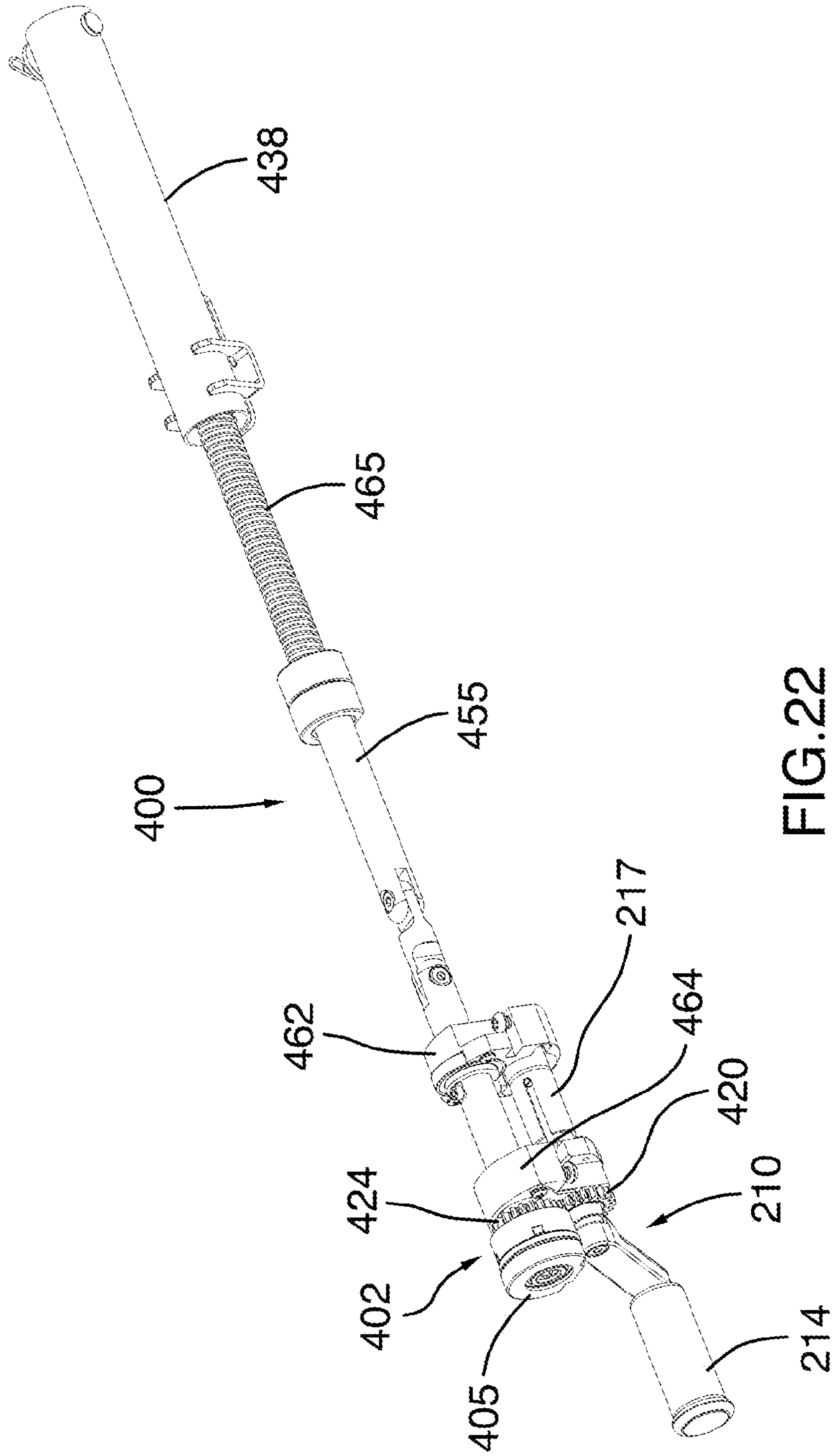
FIG. 22 is a top view of an adjusting system mounted to a lateral panel of a bed, according to another embodiment.
Figure 23:
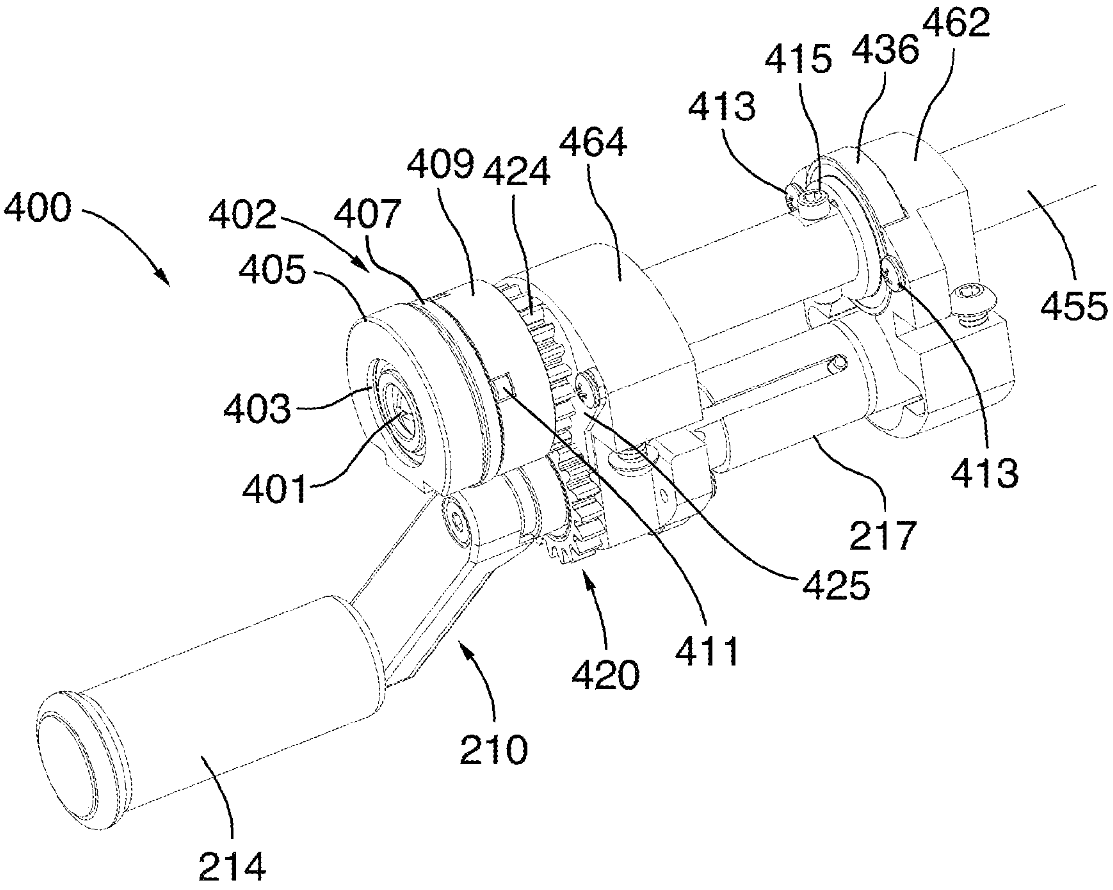
FIG. 23 is a close up top view of the adjusting system shown in FIG. 22.
Figure 24:
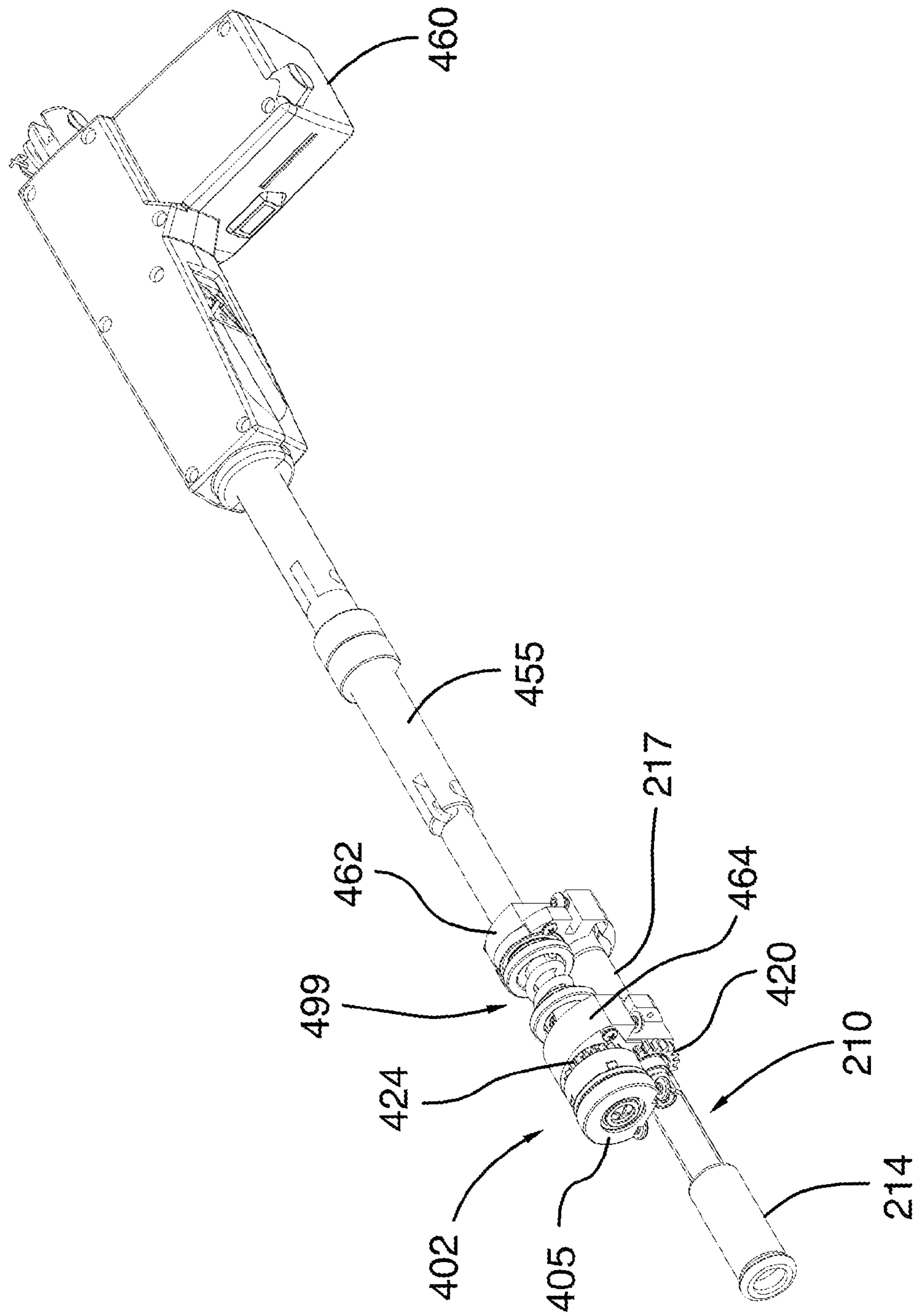
FIG. 24 is a top view of the adjusting system shown in FIG. 22 but with an added electric actuator.
Figure 25:
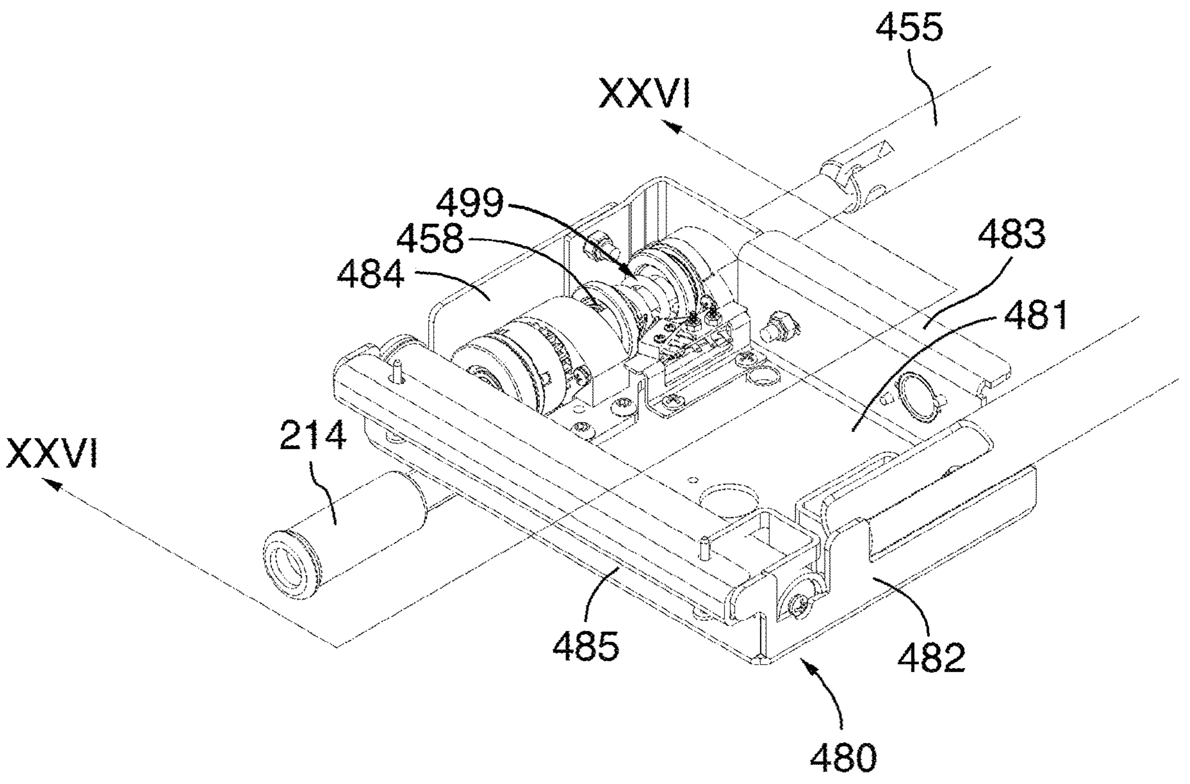
FIG. 25 is a top view of the adjusting system shown in FIG. 24, showing the adjusting assembly in a housing box to be mounted under a side panel.
Figure 26:
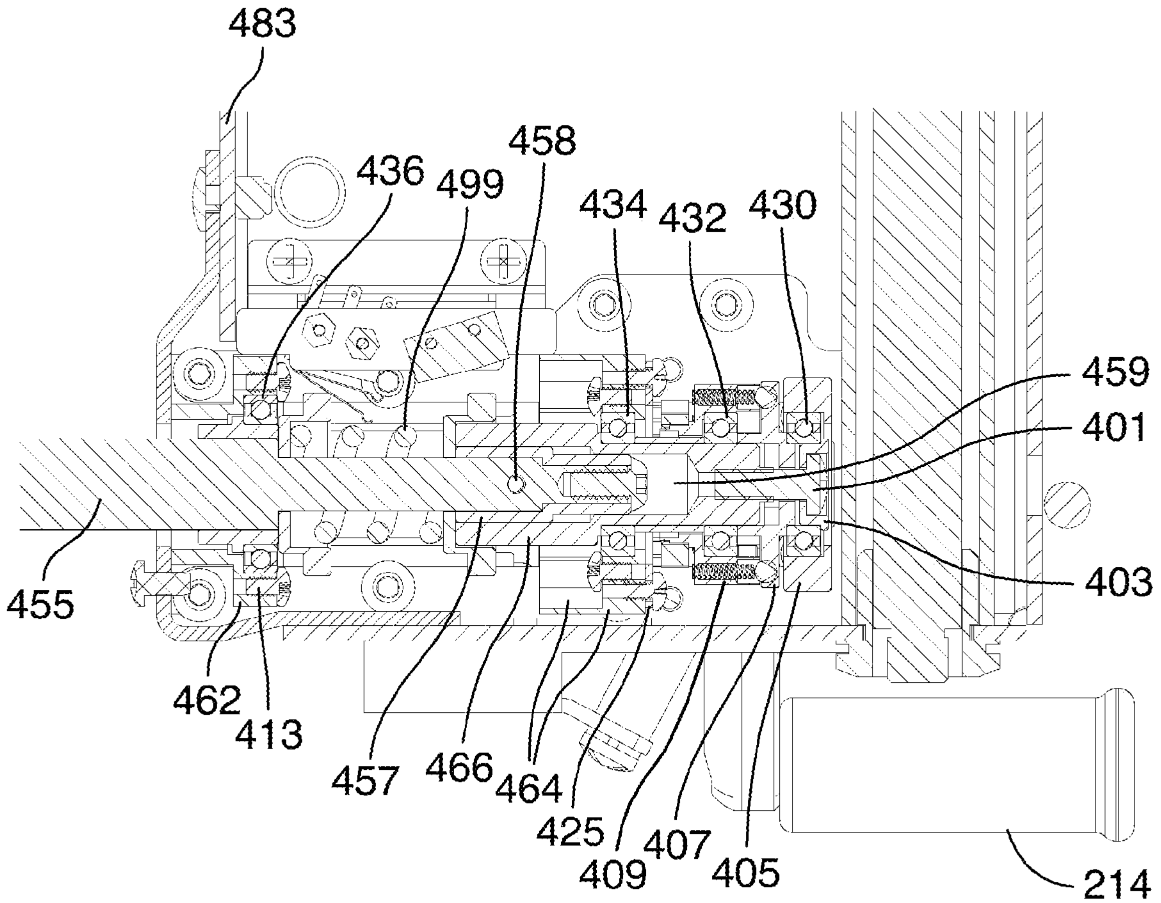
FIG. 26 is a cross section view of the adjusting system shown in FIG. 25.

In an alternative embodiment, the adjusting system for a patient support apparatus may comprise less than 4 gears. FIGS. 22 to 26 illustrate an embodiment of an adjusting system 400 for a bed which includes two gears 420 and 424. FIGS. 22 and 23 illustrate the adjusting system 400 with a manual mode of operation while FIGS. 24 to 26 illustrate the adjusting system 400 with manual and electric modes of operation. Similar to previously disclosed adjusting system 200, the adjusting system 400 may adjust the side panel 123*b*, and incorporates the telescopic handle assembly 210 of the adjusting system 200.

In addition to the gears 420 and 424, the adjusting system 400 comprises a housing or box 480 securable to a panel such as side panel 123*b*, the telescopic handle assembly 210, a clutch assembly 402 and a mounting brackets 462, 464 secured to the box 480 and used for securing the telescopic handle assembly 210, shaft 455, the gears 420 and 424 and the clutch assembly to the box 480.

In the illustrated embodiment, the telescopic handle assembly 210 is connected to the lower or first gear 420 so that an actuation of the telescopic handle assembly 210 drives a rotation of the lower gear 420. The lower gear is rotatably mounted on the mounting bracket 464 so that the lower gear may rotate relative to the mounting bracket 464. The second or upper gear 424 is also rotatably mounted on the mounting bracket 464. Furthermore, the upper gear 424 is mounted side by side with the lower gear 420 such that the teeth of the lower gear 420 engage the teeth of the upper gear 424. As a result, a rotation of the lower gear 420 drives a rotation of the upper gear 424.

The upper gear 424 is operatively connected to the clutch assembly 402 which is also operatively connected to the shaft 455 so that a rotation of the upper gear 424 drives a rotation of the shaft 455.

With reference to FIGS. 23 and 26, the clutch assembly 402 comprises a first annular ring 407 fixedly secured to the shaft 455, a second annular ring 409 fixedly secured to the upper gear 424 and a housing 405 secured to the box 480 for supporting the shaft 455. With reference to FIGS. 22 to 26, the adjusting system 400 will be described. The housing 405 houses therein a first bearing 430 and the first annular ring 407 sits on the first bearing 430, the first bearing 430 allowing rotation of the annular ring 407. The first bearing 430 is held in place by the first annular ring 407 on a first side and a sleeve 403 on the opposing side, which is secured to the shaft 455 through a threaded bolt 401, thereby securing the first annular ring 407 to the shaft 455. The first annular ring 407 can be fixedly connected to the shaft 455 through compression fitting or a fastener. The first annular ring 407 is operatively connected to the second annular ring 409, both annular rings 407 and 409 being coaxial in the illustrated embodiment. The second annular ring 409 is fixedly connected to the upper gear 424 so that rotation of the upper gear 424 cause rotation of the second annular ring 409, but neither the second annular ring 409 nor the upper gear 424 are fixed to the shaft 455. The second annular ring 409 houses therein a second bearing 432 mounted onto the shaft 455 and held in place against the second annular ring 409 by threaded bolts, the illustrated embodiment containing four threaded bolts 411 placed concentrically around the second annular ring 409. The second bearing 432 thus allows the second annular ring 409 to rotate with respect to the shaft 455.

The annular ring 407 is fixedly secured to the shaft 455 as follows. A sleeve 457 is fixedly fitted around the shaft 455. The sleeve 457 has a threaded hole which aligns with a threaded hole on the shaft. A fastener 458, such as a bolt, is then used to fasten the sleeve 457 onto the shaft 455. The sleeve 457 is further received in a second sleeve 466. The fastener 458 projects outwardly from the sleeve 457 and is received in an elongated longitudinal groove in the second sleeve 466. The elongated longitudinal groove thus allows the shaft 455 to move longitudinally relative to the sleeve 466 in a chamber 459 formed between the proximal end of the shaft 455 and the proximal end of the second sleeve 466, in response to manual or electric operation of the adjusting assembly 400, while ensuring rotational engagement between the second sleeve 466 and the shaft 455 via the fastener 458 inserted into the groove of the second sleeve 466. Therefore, a rotation of the second sleeve 466 drives a rotation of the shaft 454. The second sleeve 466 rests on second and third bearings 432, 434, allowing rotation of the second sleeve relative to the box 480 The second sleeve 466 is then further held in place by a fastener 401, a bolt in the illustrated embodiment, which is rotatably secured to the first bearing 430 by a sleeve 403.

Referring back to the clutch assembly 402 (of which the function is identical to previously described clutch assembly 222), the clutch assembly 402 comprises the second annular ring 409 which is operatively connected to the first annular ring 407 through a ball and spring arrangement as illustrated in FIG. 26. The second annular ring 409 has longitudinal recesses each for receiving a respective spring therein, while the first annular ring 407 has ball seats each for receiving a respective ball therein. The assembly of rings 407 and 409 and the springs and balls form the clutch assembly 402. Once the side panel 123*b* is in the maximum extended or fully retracted positions, the shaft 455 resists further rotation and identical to the clutch assembly 222, the balls slip out of the ball seats in the first annular ring 407, disengaging the first annular ring 407 from the second annular ring 409. Continued rotation of the shaft 455, whether through electric actuation or manual operation, will cause the second annular ring 409, and the upper gear 424 to which it is fixedly connected, to rotate against the first annular ring 407, while the first annular ring 407 is virtually static. As with the clutch assembly 222, this prevents damage to the components by preventing excess stress buildup resulting from operation of the adjusting assembly 400 beyond the maximum or minimum positions or due to blocking external forces (e.g. abutting a wall). As illustrated in FIGS. 25 and 26, the adjusting assembly 400 is housed inside a box 480 comprising a base 481 and four walls 482, 483, 484, 485 extending orthogonal to the base 481 at each side of the base 481. The shaft 455 is received in an aperture in the wall 483 of the box 480. A sleeve 463 receives the shaft 455 and the sleeve 463 is supported on a fourth bearing 436 in order to allow rotational movement of the shaft 455. The fourth bearing 436 is fastened to a second mounting bracket 462 by fasteners 413. In one embodiment such as the embodiment illustrated in FIG. 26, the adjusting assembly further comprises a shock-absorbing assembly 499, as previously described with reference to the shock-absorbing assembly 299 and the adjusting system 200.

Referring to FIGS. 22 and 23, operation of the adjusting assembly 400 in manual mode is described hereinafter. First, an operator extends the telescopic handle assembly 210 in order to access the handle. Upon rotation of the handle by the operator, the telescopic handle assembly 210 transmits the rotational movement to the lower gear 420. Given that the lower gear 420 is operatively connected to the upper gear 424 through the teeth of each respective gear, rotation of the handle portion 214 cause rotation of the upper gear 424. Rotation of the upper gear 424 then causes rotation of the first annular ring 407 through rotation of the second annular ring 409 fixedly secured to the upper gear 424. Given that the first annular ring 407 is fixedly connected to the shaft 455, the shaft 455 is thereby rotated. The first annular ring 407 defines a chamber therein for receiving the shaft 455, thereby allowing longitudinal movement of the shaft relative to the first annular ring 407. The shaft 455 includes a threaded section 465, which is received in an elongated tube 438 with an internal thread for receiving the threaded section 465. Continued rotation of the shaft 455 in the elongated tube 438 thereby causes lateral movement of the side panel 123*b* with respect to the central frame 206 of the bed. The shaft 455 is constrained on one end by the first annular ring 407, so that the shaft abuts the first annular ring 407 in the extended position, and by the bolt 415 which is fixedly connected to the shaft 455 on an opposing end so that when it is fully retracted, the bolt 415 abuts the fourth bearing 436 and prevents further retraction of the shaft 455. If an embodiment in which the adjusting system 400 is motorized as illustrated in FIGS. 24 to 26, additional considerations must be made. Firstly, it is preferred that the motorized assembly should not engage with the telescopic handle assembly 210 during motorized movement, preventing rotation of the telescopic handle assembly 210. Without rotation of the telescopic handle assembly 210 during motorized movement, the handle can be placed as close as possible to the support panels 123*b*, allowing greater room under the hospital bed 100. Additionally, disengaging and preventing movement of the handle from the electric actuator 460 prevent the telescopic handle from interfering with objects in its vicinity during electric operation. Accordingly, a lower gear lock 425 is implemented to prevent motion of the gears 420, 424 during electric operation. The lower gear lock 425 is fixedly connected to the mounting bracket 464 and is designed to operatively engage the teeth of the lower gear 420. The lower gear 420 is made moveable between a first extended position and a second retracted position. When the handle 418 is fully extended, a pin 280 pushes against the lower gear 420, moving the lower gear 420 to a first extended position. In the first extended position, the lower gear lock 425 does not engage the lower gear 420, allowing rotational movement of the lower gear 420. This permits rotational movement from the handle portion 214 to be transferred to the shaft 455 and driving a displacement of the side panel 123*b* relative to the central frame 206. Once the handle portion 214 is released and the telescopic handle assembly 210 is retracted, the action of the springs 272 and 275 pushes the handle assembly 210 against the lower gear 420, locking it into place against the lower gear lock 425. With the handle assembly thus in the retracted position, the lower gear lock 425 prevents rotation of the lower gear 420 and therefore the upper gear 424. The electric actuator 460 therefore must displace the side panel 123*b* through linear movement only. In the preferred embodiment, the electric actuator 460 is a linear actuator.

The electric actuator 460 is able to both receive rotational movement in order to handle manual movement of the side panel 123*b* through rotational movement imparted on the handle assembly 210, as well as impart purely lateral movement on the shaft 455 during electric operation in order to prevent movement of the gears 420, 424 and the handle assembly 210. This is due to the screw and nut electric actuator mechanism that is well-known in the art. In manual mode, the shaft 455 rotates and has a female threaded end (not shown) that rotates onto a static male threaded screw (not shown) in the electric actuator 460, thereby changing the shaft's length. In electric mode, the screw turns inside the actuator (not shown) while the shaft 455 does not rotate due to action of the gear lock 425, changing the shaft's length without rotation of the shaft due to action of the threads between the two parts.

It should be understood that the adjusting systems 200 and 400 may be used on any bed having a central frame and a side panel movable relative to the central frame. For example, the adjusting systems 200 and 400 may be used with the type of hospital bed shown in FIGS. 1 to 3 that is provided with a plurality of independent side panel sections, but the skilled addressee will appreciate that various other types of hospital beds could be considered. The skilled addressee will also appreciate that the present adjusting systems 200 and 400 may also be used independently or in combination with each other.

It will also be understood that although the handle assembly is a telescopic handle assembly 210 in the preferred embodiments, it is possible for a non-telescopic handle to be used in conjunction with the adjusting systems 200 or 400.

It will be further understood that though in the preferred embodiment the adjusting systems 200 or 400 is used to extend the width of a patient support apparatus such as a bed 100, the adjustable panel could also be used to extend the length or radial dimension of a patient support apparatus.

Although the above description relates to specific preferred embodiments as presently contemplated by the inventors, it will be understood that the invention in its broad aspect includes mechanical and functional equivalents of the elements described herein.

The invention claimed is:

1. An adjusting system for a patient support apparatus including a central resting surface and a panel section movable relative to the central resting surface between a retracted position and an extended position, the adjusting system comprising:

a bracket mounted to the panel section;

a handle assembly rotatably mounted to the bracket, the handle assembly comprising a first end allowing a user to manually operate the adjusting system and a second end rotatably mounted to the bracket;

an extending member comprising a first end rotatably mounted to the bracket and a second end operatively couplable to the resting surface of the patient support apparatus, the extending member being capable of extending and retracting along a longitudinal axis; and a clutch assembly operatively mounted to the bracket, the clutch assembly operatively engaging the second end of the handle assembly and the first end of the extending member, the clutch assembly urging movement of the extending member upon actuation of the handle assembly in response to the extending member exerting a resistance below a defined resistance level, the clutch assembly preventing rotation of the extending member upon actuation of the handle assembly in response to the extending member exerting a resistance above or equal to the defined resistance level, wherein the rotation of the extending member in a first rotation direction causes the panel section to move toward the extended position relative to the central resting surface while the rotation of the extending member in an opposed rotation direction causes the panel section to move toward the retracted position.

2. The adjusting system of claim 1, further comprising a housing mounted to the panel section, the bracket being mounted to the housing.

3. The adjusting system of claim 1, further comprising a gear assembly rotatably mounted to the bracket, the gear assembly collaborating with the clutch assembly to urge movement of the extending member upon actuation of the handle assembly.

4. The adjusting system of claim 3, wherein the gear assembly comprises a first, second, third and fourth gears, the first gear being operatively coupled to the second end of the handle assembly and engaging the second gear, the fourth gear being operatively coupled to the first end of the extending member and being operatively engaged by the third gear, the clutch assembly being operatively coupled between the second gear and the third gear.

5. The adjusting system of claim 4, wherein:

the first gear is coplanar with the second gear;

the third gear is coplanar with the fourth gear; and the second and third gears are coaxial.

6. The adjusting system of claim 5, wherein the first, second, third and fourth gear each comprise a spur gear.

7. The adjusting system of claim 5, wherein the clutch assembly comprises at least one ball and at least one spring, a given one of the second and third gears being provided with at least one ball seat each for receiving a portion of a respective one of the at least one ball, another one of the second and third gears being provided with at least one recess each for receiving a respective one of the at least one spring, the at least one ball and at least one spring allowing removable engagement of the second and third gears.

8. The adjusting system of claim 3, wherein the gear assembly comprises first and second gears, the first gear being operatively coupled to the second end of the handle assembly and operatively engaging the second gear, the clutch assembly being operatively coupled between the second gear and the first end of the extending member.

9. The adjusting system of claim 8, wherein the clutch assembly comprises at least one ball, at least one spring, a first annular ring coupled to the first end of the extending member and a second annular ring secured to the second gear, a given one of the first annular ring and the second annular ring being provided with at least one ball seat each for receiving a portion of a respective one of the at least one ball, another one of the first annular ring and the second annular ring being provided with at least one recess each for receiving a respective one of the at least one spring, the at least one ball and at least one spring allowing removable engagement of the first annular ring and the second annular ring.

10. The adjusting system of claim 1, further comprising a housing mounted to the panel section, the bracket being mounted to the housing.

11. The adjusting system of claim 1, wherein the handle assembly is telescopic.

12. The adjusting system of claim 11, wherein the handle assembly comprises at least two sections.

13. The adjusting system of claim 1, wherein the extending member comprises a worm threadingly engageable to the resting surface of the patient support apparatus.

14. The adjusting system of claim 1, further comprising an electric actuator for operating the extending member.

15. An adjusting system for adjusting a configuration of a patient support apparatus, the patient support apparatus comprising a central portion and an adjustable panel movable relative to the central portion, the adjusting system comprising:

a frame securable to the adjustable panel of the patient support apparatus;

an extending member rotatably secured to the frame, the extending member extending along a longitudinal axis;

a handle assembly operatively connected at a given end of the extending member for rotating the extending member about the longitudinal axis; and a worm being connected to the extending member, the worm being threaded and operatively moveable within a respective threaded receiving portion attached to the central portion so that a rotation of the handle assembly causes a rotation of the worm in the threaded receiving portion driving a displacement of the adjustable panel relative to the central portion, wherein the handle assembly is telescopic, wherein the handle assembly comprises:

a first body being tubular and rotatably secured to the frame;

a second body being tubular and having a given end slidably inserted into the first body;

a third body extending between a first end and a second end, the first end being slidably inserted into the second body; and a handle operatively connected to the second end of the third body, the telescopic handle assembly being selectively movable between an extended position and a retracted position, wherein the handle assembly is biased into the retracted position, the adjusting system further comprising a first spring received within the second body and a second spring received within the third body, the first and second springs biasing the handle assembly to the retracted position.

16. The adjusting system of claim 15, further comprising an electric actuator for operating the extending member.

17. An adjusting system for adjusting a configuration of a patient support apparatus, the patient support apparatus comprising a central portion and an adjustable panel movable relative to the central portion, the adjusting system comprising:

a frame securable to the adjustable panel of the patient support apparatus;

an extending member rotatably secured to the frame and operatively couplable to the central portion of the patient support apparatus, the extending member being capable of extending and retracting along a longitudinal axis; and a telescopic handle assembly operatively connected to the extending member for rotating the extending member about the longitudinal axis, the telescopic handle assembly comprising a handle for grasping by a user, wherein rotation of the handle in first and second rotation directions causes the extending member to extend and retract along the longitudinal axis respectively in order to drive a displacement of the adjustable panel relative to the central portion, the telescopic handle assembly being selectively movable between:

an extended position in which the handle extends outward from under the adjustable panel; and a retracted position in which the handle extends below the adjustable panel and does not extend outward from under the adjustable panel, the telescopic handle assembly being biased to the retracted position, wherein the telescopic handle assembly comprises:

a first tubular body rotatably secured to the frame;

a second tubular body slidably inserted into the first tubular body;

a third body extending from a first end to a second end, the first end being slidably inserted into the second tubular body;

the handle operatively connected to the second end of the third tubular body; and a first spring received within the second tubular body and a second spring received within the third tubular body, the first and second springs biasing the handle assembly to the retracted position.

* * * * *